(12) United States Patent
Wu et al.

(10) Patent No.: US 11,704,501 B2
(45) Date of Patent: Jul. 18, 2023

(54) PROVIDING A RESPONSE IN A SESSION

(71) Applicant: Microsoft Technology Licensing, LLC, Redmond, WA (US)

(72) Inventors: Xianchao Wu, Tokyo (JP); Ying Wang, Bellevue, WA (US); Hailong Mu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 474 days.

(21) Appl. No.: 16/755,120

(22) PCT Filed: Nov. 24, 2017

(86) PCT No.: PCT/CN2017/112831
§ 371 (c)(1),
(2) Date: Apr. 9, 2020

(87) PCT Pub. No.: WO2019/100319
PCT Pub. Date: May 31, 2019

(65) Prior Publication Data
US 2020/0327327 A1  Oct. 15, 2020

(51) Int. Cl.
*G06F 40/35* (2020.01)
*G06F 16/9032* (2019.01)
(Continued)

(52) U.S. Cl.
CPC .......... *G06F 40/35* (2020.01); *G06F 16/5866* (2019.01); *G06F 16/90332* (2019.01);
(Continued)

(58) Field of Classification Search
CPC ........ G06V 20/20; G06V 20/35; G06V 10/82; G06V 20/36; G06V 20/70;
(Continued)

(56) References Cited

U.S. PATENT DOCUMENTS 9,571,645 B2 *  2/2017  Quast ..................... G06Q 50/30
10,154,071 B2 * 12/2018  Bostick ................ G06V 40/161
(Continued)

FOREIGN PATENT DOCUMENTS

CN         1514399 A         7/2004
CN      102323926 A   *    1/2012
(Continued)

OTHER PUBLICATIONS

"Second Office Action and Search Report Issued in Chinese Patent Application No. 201780086747.5", dated Dec. 7, 2021, 14 Pages.
(Continued)

*Primary Examiner* — Mahendra R Patel
(74) *Attorney, Agent, or Firm* — Schwegman Lundberg & Woessner, P.A.

(57) ABSTRACT

The present disclosure provides method and apparatus for providing a response to a user in a session. At least one message associated with a first object may be received in the session, the session being between the user and an electronic conversational agent. An image representation of the first object may be obtained. Emotion information of the first object may be determined based at least on the image representation. A response may be generated based at least on the at least one message and the emotion information. The response may be provided to the user.

19 Claims, 20 Drawing Sheets

(51) Int. Cl.
  *G06F 16/58* (2019.01)
  *H04L 51/02* (2022.01)
  *G06V 20/20* (2022.01)
  *G06V 20/00* (2022.01)
  *G06N 3/045* (2023.01)
  *G06V 30/19* (2022.01)
  *G06V 30/262* (2022.01)
  *G06V 10/82* (2022.01)
  *G06V 20/70* (2022.01)

(52) U.S. Cl.
  CPC ............ *G06N 3/045* (2023.01); *G06V 10/82* (2022.01); *G06V 20/20* (2022.01); *G06V 20/35* (2022.01); *G06V 20/36* (2022.01); *G06V 20/70* (2022.01); *G06V 30/19173* (2022.01); *G06V 30/274* (2022.01); *H04L 51/02* (2013.01)

(58) Field of Classification Search
  CPC ............ G06V 30/19173; G06V 30/274; G06F 16/5866; G06F 16/90332; G06F 40/35; G06F 40/30; G06N 3/0454; G06N 3/006; G06N 3/0445; G06N 3/08; G06N 5/02; G06N 20/10; G06N 3/045; G06N 3/044; H04L 51/02
  USPC ........................................................ 382/156
  See application file for complete search history.

(56) References Cited

U.S. PATENT DOCUMENTS

| | | | | |
|---|---|---|---|---|
| 10,884,503 | B2* | 1/2021 | Divakaran | G06N 20/10 |
| 11,070,879 | B2* | 7/2021 | Wu | H04L 51/02 |
| 2004/0039483 | A1* | 2/2004 | Kemp | B62D 57/02 |
| | | | | 700/245 |
| 2005/0192025 | A1* | 9/2005 | Kaplan | G06F 16/9537 |
| | | | | 455/414.1 |
| 2008/0096533 | A1* | 4/2008 | Manfredi | G06N 3/006 |
| | | | | 455/412.1 |
| 2012/0239504 | A1* | 9/2012 | Curlander | G06Q 30/02 |
| | | | | 705/14.66 |
| 2014/0122618 | A1* | 5/2014 | Duan | H04L 51/02 |
| | | | | 709/206 |
| 2017/0147202 | A1* | 5/2017 | Donohue | G06F 3/04886 |
| 2017/0310613 | A1* | 10/2017 | Lalji | H04L 63/083 |
| 2018/0005646 | A1* | 1/2018 | Un | G06F 40/30 |
| 2018/0083901 | A1* | 3/2018 | McGregor, Jr. | H04L 51/02 |
| 2018/0174055 | A1* | 6/2018 | Tirumale | H04L 51/04 |
| 2018/0357286 | A1* | 12/2018 | Wang | G06F 40/30 |
| 2019/0005021 | A1* | 1/2019 | Miller | G10L 15/26 |

FOREIGN PATENT DOCUMENTS

| | | | | |
|---|---|---|---|---|
| CN | 102323926 | A | 1/2012 | |
| CN | 103612252 | A | 3/2014 | |
| CN | 104317298 | A | 1/2015 | |
| CN | 104656653 | A | 5/2015 | |
| CN | 106937531 | A | 7/2017 | |
| CN | 109844741 | A * | 6/2019 | .......... G06F 17/274 |
| CN | 110178132 | A * | 8/2019 | .......... G06F 40/274 |
| EP | 1605436 | A1 | 12/2005 | |
| KR | 20090112213 | A | 10/2009 | |
| WO | 02057896 | A2 | 7/2002 | |
| WO | WO-2007134402 | A1 * | 11/2007 | ............. G06F 40/20 |
| WO | WO-2008049834 | A2 * | 5/2008 | ............. G06N 3/006 |
| WO | WO-2013155619 | A1 * | 10/2013 | ....... G06F 16/90332 |

OTHER PUBLICATIONS

"Third Office Action Issued in Chinese Patent Application No. 201780086747.5", dated Apr. 15, 2022, 10 Pages.

"First Office Action and Search Report Issued in Chinese Patent Application No. 201780086747.5", (w/ Concise Statement of Relevance), dated Feb. 2, 2021, 11 Pages.

"VIM—Virtual Interactive Museum", Retrieved From: https://web.archive.org/web/20160913130736/http:/www.cal-tek.eu/cultural-heritage/vim-virtual-interactive-museum/, Sep. 13, 2016, 2 Pages.

Ashri, Ronald, "How Museums Are Using Chatbots", Retrieved From: https://chatbotsmagazine.com/how-museums-are-using-chatbots-5-real-world-examples-34e9d4858dd9?gi=c173ae3ed4a9, Apr. 3, 2017, 4 Pages.

"International Search Report and Written Opinion Issued in PCT Application No. PCT/CN17/112831", dated Aug. 16, 2018, 9 Pages.

Suzi, "14 Ways a Virtual Assistant Can Help an Artist", Retrieved From: https://youradminbff.com/14-ways-a-virtual-assistant-can-help-an-artist/, Jun. 11, 2014, 6 Pages.

"Search Report issued in European Patent Application No. 17932724.2", dated Apr. 30, 2021, 9 Pages.

Dong, et al., "Unsupervised Image-to-Image Translation with Generative Adversarial Networks", in Repository of arXiv:1701.02676v1, Jan. 10, 2017, 5 Pages.

Oh, et al., "A Chatbot for Psychiatric Counseling in Mental Healthcare Service Based on Emotional Dialogue Analysis and Sentence Generation", In Proceedings of the IEEE 18th International Conference on Mobile Data Management, Jan. 10, 2017, pp. 371-376.

Sheng, et al., "A Dataset for Multimodal Question Answering in the Cultural Heritage Domain", In Proceedings of the Workshop on Language Technology Resources and Tools for Digital Humanities, Dec. 11, 2016, pp. 10-17.

Wu, et al., "Visual Question Answering: A Survey of Methods and Datasets", In Journal of Computer Vision and Image Understanding, vol. 163, Oct. 2017, pp. 21-40.

"Office Action Issued in European Patent Application No. 17932724.2", dated Oct. 12, 2022, 9 Pages.

"Notice of Allowance Issued in Chinese Patent Application No. 201780086747.5", dated Jul. 27, 2022, 8 Pages.

Bin, Zhang, "Research on Emotion Recognition in Speech Based on Cepstral Distance Feature and CNN", A Dissertation Submitted for the Degree of Master's in Hefei University of Technology, Apr. 2016, 72 Pages.

* cited by examiner

PROVIDING A RESPONSE IN A SESSION

CROSS-REFERENCE TO RELATED APPLICATION

This application is a U.S. National Stage Filing under 35 U.S.C. 371 of International Patent Application Serial No. PCT/CN2017/112831, filed Nov. 24, 2017, and published as WO 2019/100319 A1 on May 31, 2019, which application and publication are incorporated herein by reference in their entirety.

BACKGROUND

Artificial Intelligence (AI) chatbot is becoming more and more popular, and is being applied in an increasing number of scenarios. The chatbot is designed to simulate people's conversation, and may chat with users by text, speech, image, etc. Generally, the chatbot may scan for keywords within a message input by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for providing a response to a user in a session. At least one message associated with a first object may be received in the session, the session being between the user and an electronic conversational agent. An image representation of the first object may be obtained. Emotion information of the first object may be determined based at least on the image representation. A response may be generated based at least on the at least one message and the emotion information. The response may be provided to the user.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
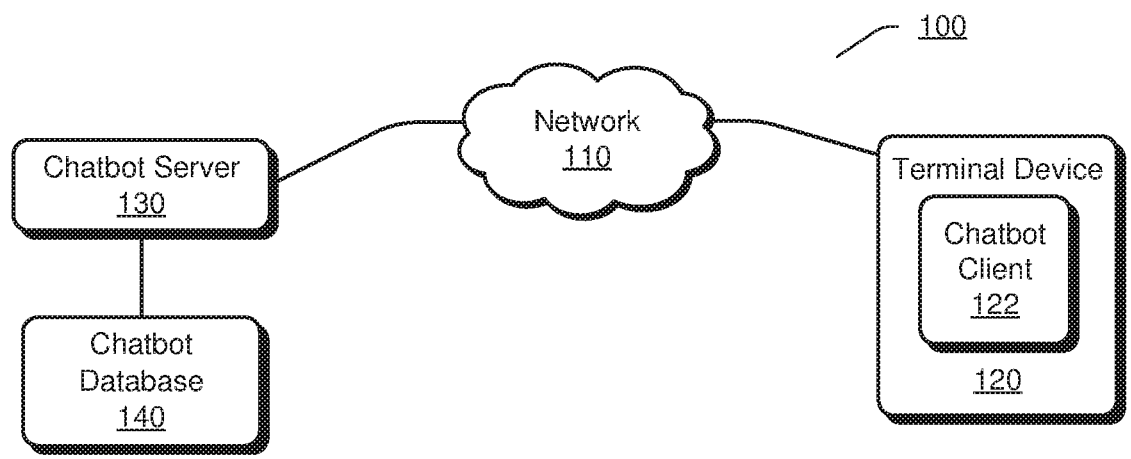
FIG. 1 illustrates an exemplary network architecture deploying a chatbot according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

When people are visiting art galleries, museums, exhibition halls, etc., they may need commentators to help explaining details of exhibited articles. It is not easy for real-people commentators to remember knowledge related to the exhibited articles, and this may cost a long training time for the real-people commentators to learn the knowledge and to practice how to express the knowledge to visitors. Furthermore, visitors may have various background knowledge levels and consequently may have various types of question even to the same exhibited article. Thus, when the real-people commentators are communicating with the visitors, it is also a challenge for the real-people commentators to provide appropriate answers to the visitors' questions.

Embodiments of the present disclosure propose to utilize an electronic conversational agent to provide assistance to a user when the user is enjoying or visiting objects of interest, e.g., artworks, cultural relics, science and technology exhibits, photography works, etc. The assistance may comprise explaining details or background knowledge related to the objects of interest, answering questions related to the objects of interest from the user, conducting image-based interactions with the user, etc. The electronic conversational agent may provide the assistance in a session with the user. The electronic conversational agent may be, such as, a chatbot. Conventionally, a chatbot may conduct automated sessions with a user. Herein, "session" may refer to a time-continuous dialog between two chatting participants and may include messages and responses in the dialog, wherein "message" refers to any information input by the user, e.g., queries from the user, answers of the user to questions from the chatbot, opinions of the user, etc., and "response" refers to any information provided by the chatbot, e.g., answers of the chatbot to questions from the user, comments of the chatbot, etc. The term "message" and the term "query" may also be interchangeably used.

According to the embodiments of the present disclosure, the chatbot may identify and understand an object of interest which is indicated by the user in the session. According to an aspect, the chatbot may retrieve knowledge information related to the object from pre-established knowledge graphs. Taking a piece of artwork as an example of the object, the knowledge information may comprise artist, location, time, style, etc., wherein "artist" refers to a person who made the artwork, "location" refers to a place where the artwork was made or where the artwork is showing, "time" refers to a date or time period when the artwork was made, and "style" refers to a category of the artwork. The pre-established knowledge graphs may have stored the knowledge information related to the artwork, and thus the chatbot may answer the user's questions based on the retrieved knowledge information. According to another aspect, the chatbot may obtain an image representation of the object, and determine fact information and/or emotion information related to the object based at least on the image representation of the object. Herein, "image representation" may refer to a photo, video image, screenshot, etc. of the object that is provided by the user or captured by the chatbot. In an implementation, the chatbot may classify the object into a corresponding category based at least on the emotion information. Taking a piece of artwork as an example of the object, the chatbot may determine an emotion category of the artwork through emotion analysis. The chatbot may also determine a domain category of the artwork, wherein in this case, "domain category" refers to well-known categories in the art domain. In an implementation, the chatbot may retrieve an image representation of another object that is similar with the object of interest based at least on the emotion information. For example, when the user is asking whether there are any artworks in a similar style with the current artwork of interest, the chatbot may provide an image representation of another artwork to the user according to the style or category of the current artwork of interest. In an implementation, the chatbot may conduct image-based interactions with the user through, such as, changing an image representation of an object of interest. For example, the user may desire to change a face region in a painting with a face region in an image designated by the user, and the chatbot may generate an updated painting in which the face region in the painting has been changed to the face region in the designated image and the style of the painting is transferred to the face region in the updated painting.

FIG. 1 illustrates an exemplary network architecture 100 deploying a chatbot according to an embodiment.

In FIG. 1, a network 110 is applied for interconnecting among a terminal device 120 and a chatbot server 130.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be desktop computers, laptops, tablets, smart phones, AI terminals, wearable devices, etc. The terminal device 120 may be carried by users, or deployed at locations of partners, e.g., art galleries, museums, exhibition halls, etc. Although only one terminal device is shown in FIG. 1, it should be appreciated that a different number of terminal devices may connect to the network 110.

In an implementation, the terminal device 120 may be used by a user. The terminal device 120 may include a chatbot client 122 which may provide automated chatting service for the user. In some cases, the chatbot client 122 may interact with the chatbot server 130. For example, the chatbot client 122 may transmit messages input by the user to the chatbot server 130, receive responses associated with the messages from the chatbot server 130, and provide the responses to the user. However, it should be appreciated that, in other cases, instead of interacting with the chatbot server 130, the chatbot client 122 may also locally generate responses to messages input by the user.

The chatbot server 130 may connect to or incorporate a chatbot database 140. The chatbot database 140 may comprise information that can be used by the chatbot server 130 for generating responses.

It should be appreciated that all the network entities shown in FIG. 1 are exemplary, and depending on specific application requirements, any other network entities may be involved in the application scenario 100.

Figure 2:
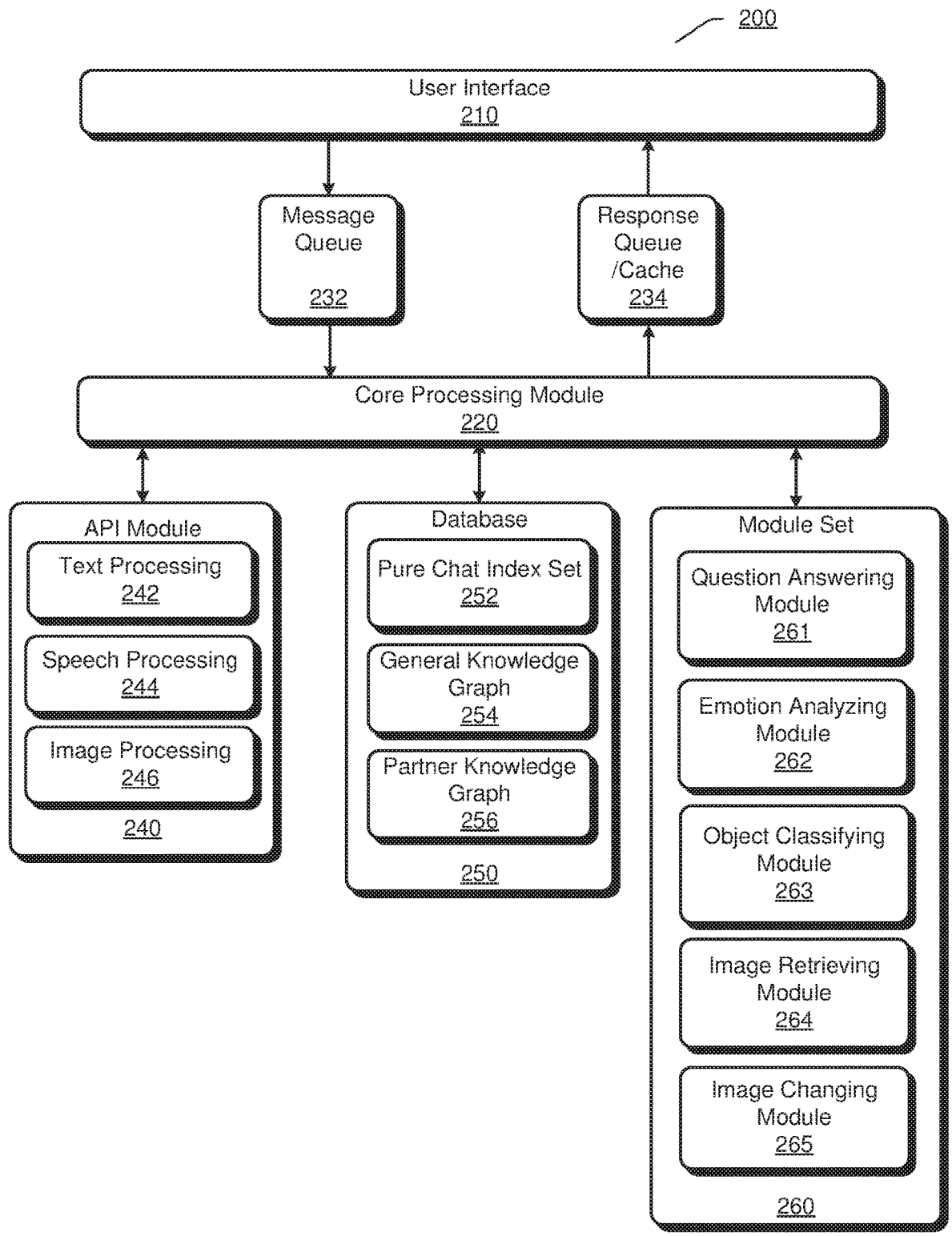
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages input by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through a database 250. The database 250 may comprise a plurality of index items that can be retrieved by the core processing module 220 for determining responses.

The database 250 may comprise a pure chat index set 252. The pure chat index set 252 may comprise index items that are prepared for free chatting between the chatbot and users, and may be established with data from, e.g., social networks. The index items in the pure chat index set 252 may or may not be in a form of question-answer (QA) pair, e.g., <question, answer>. Question-answer pair may also be referred to as message-response pair.

The database 250 may comprise a general knowledge graph 254. Herein, the general knowledge graph 254 may refer to a single knowledge graph or a combination of a plurality of knowledge graphs that contains knowledge information related to objects of interest. The general knowledge graph 254 may be established based on various public knowledge sources, e.g., public websites on the network, publications, etc. For example, knowledge-style websites may contain various knowledge records related to objects of interest, and these knowledge records may be used for establishing a general knowledge graph related to the objects. This general knowledge graph may be continuously extended with more and more knowledge is obtained from the network.

The database 250 may comprise a partner knowledge graph 256. Herein, the partner knowledge graph 256 may refer to a single knowledge graph or a combination of a plurality of knowledge graphs. The partner knowledge graph 256 may be established based on knowledge sources of a target partner. For example, assuming that the British Museum is a target partner, a corresponding partner knowledge graph may be established based on various knowledge records specific to the British Museum, wherein the knowledge records may comprise introductions of exhibited articles in the British Museum that are recited on, such as, an official website of the British Museum.

It should be appreciated that the general knowledge graph 254 and the partner knowledge graph 256 are divided based on knowledge sources that are used for establishing knowledge graphs. These knowledge graphs may be further divided based on major contents in knowledge graphs. Taking the art domain as an example, according to major contents in knowledge graphs, the knowledge graphs may be divided as artwork centered knowledge graph, artist centered knowledge graph, location centered knowledge graph, etc.

The chatbot system 200 may comprise a module set 260 which is a collection of functional modules that can be operated by the core processing module 220 to generate or obtain responses.

The module set 260 may comprise a question answering module 261. The question answering module 261 may be configured for performing deep question answering based at least on knowledge graphs. Herein, "knowledge graphs" may comprise the general knowledge graph 254 and the partner knowledge graph 256. The knowledge graphs may contain internal knowledge and external knowledge related to an object of interest. The internal knowledge refers to information that the object itself conveys or presents, e.g., what characters are included in the object, what scenario is depicted in the object, etc. The external knowledge includes background information of the object, e.g., a creator's living or emotion conditions during creating the object, the creator's age, family situation and other related attributes, etc. Taking the famous painting "Mona Lisa" as an example, knowledge about Mona Lisa belongs to "internal knowledge" and knowledge about the artist "Da Vinci" belongs to "external knowledge". When receiving a question on an object from the user, the question answering module 261 may determine a response from internal knowledge and/or external knowledge related to the object in the knowledge graphs. The question answering module 261 may adopt a latent semantic matching algorithm, e.g., a learning-to-rank (LTR) framework with rich latent semantic features, for matching the user's questions with knowledge information in the knowledge graphs. The matching is performed in a latent semantic space. Both the questions and the knowledge information may be in various forms, e.g., text, image, etc.

The module set 260 may comprise an emotion analyzing module 262. The emotion analyzing module 262 may be configured for performing emotion analysis on text, image, etc. For example, when obtaining an image representation of an object of interest, the emotion analyzing module 262 may derive an emotion category that the object is conveying based at least on the image representation. Moreover, for example, when establishing a knowledge graph, the emotion analyzing module 262 may derive an emotion category of textual description or image representation of an object, and attach the emotion category to the object in the knowledge graph.

The module set 260 may comprise an object classifying module 263. The object classifying module 263 may be configured for classifying an object of interest into a corresponding category, e.g., an emotion category or a domain category. As for the emotion category, the object classifying module 263 may cooperate with the emotion analyzing module 262 to derive an emotion category of the object based at least on an image representation of the object. As for the domain category, the object classifying module 263 may classify the object into a well-known category in a domain of the object. Taking an artwork as an example of the object, well-known categories in the art domain may be determined based on, e.g., time, location, etc. For example, as for western paintings, well-known categories may comprise: the Stone Age, the Ancient Near East, the Ancient Egypt, the art of Ancient Greece, the Ancient Rome, the Early Middle Age, the Romanesque Art, Precursors of the Renaissance, the Early Renaissance, the High Renaissance in Italy, the Mannerism in the Later Sixteen Century in Italy, the Nineteenth-Century Realism, the Cubism/Futurism and related Twentieth-Century Styles, etc. In an implementation, the object classifying module 263 may adopt emotion information of the object when classifying the object into a domain category. Through considering emotion information of the object, the domain category of the object may be determined in a more accurate approach.

The module set 260 may comprise an image retrieving module 264. The image retrieving module 264 may be configured for retrieving an image representation of another object corresponding to a current object of interest, e.g., similar with the current object of interest in terms of style or category. Knowledge graphs may comprise text descriptions and/or image representations of various candidate objects. The image retrieving module 264 may find the similar object through performing, e.g., latent semantic matching and/or dense vector space matching, between the object of interest and the knowledge graphs. Various features may be used in a LTR model for selecting a candidate object, such as, creator, location, time, dense vector of image representations, etc. Moreover, the image retrieving module 264 may perform an image-to-text conversion, such that the image representation of the object of interest may be converted into a text representation, and the text representation may be additionally used in the LTR model to compare with text descriptions of the candidate objects in the knowledge graph. In an implementation, the image retrieving module 264 may adopt similarity scores between emotion information of the object of interest and emotion information of the candidate objects as a feature in the LTR model. Through considering emotion information, the retrieved image representation of the similar object may be more relevant with the object of interest in terms of style or category.

The module set 260 may comprise an image changing module 265. The image changing module 265 may be configured for conducting image-based interactions with the user through changing an image representation of an object of interest. The image changing module 265 may generate an updated image representation through a generative adversarial network (GAN), wherein, in the updated image, a face region in the image representation of the object of interest has been replaced by a face region in an image designated by the user. In an implementation, the user may also designate an emotion which is desired to convey in the updated image representation. Thus, the image changing module 265 may also consider the designated emotion during generating the updated image representation through the GAN. The above image-based interactions with the user may improve the user's interests of chatting and interaction with the chatbot.

The core processing module 220 may provide responses, which are determined based on outputs from the modules 261 to 265, to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message input by the user is "Did you eat your breakfast?", two responses may be determined, such as, a first response "Yes, I ate bread" and a second response "How about you? Still feeling hungry?". In this case, through the response cache 234, the chatbot may ensure that the first response is provided to the user immediately. Further, the chatbot may ensure that the second response is provided in a time delay, such as 1 or 2 seconds, so that the second response will be provided to the user 1 or 2 seconds after the first response. As such, the response cache 234 may manage the to-be-sent responses and appropriate timing for each response.

The responses in the response queue or response cache 234 may be further transferred to the UI 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
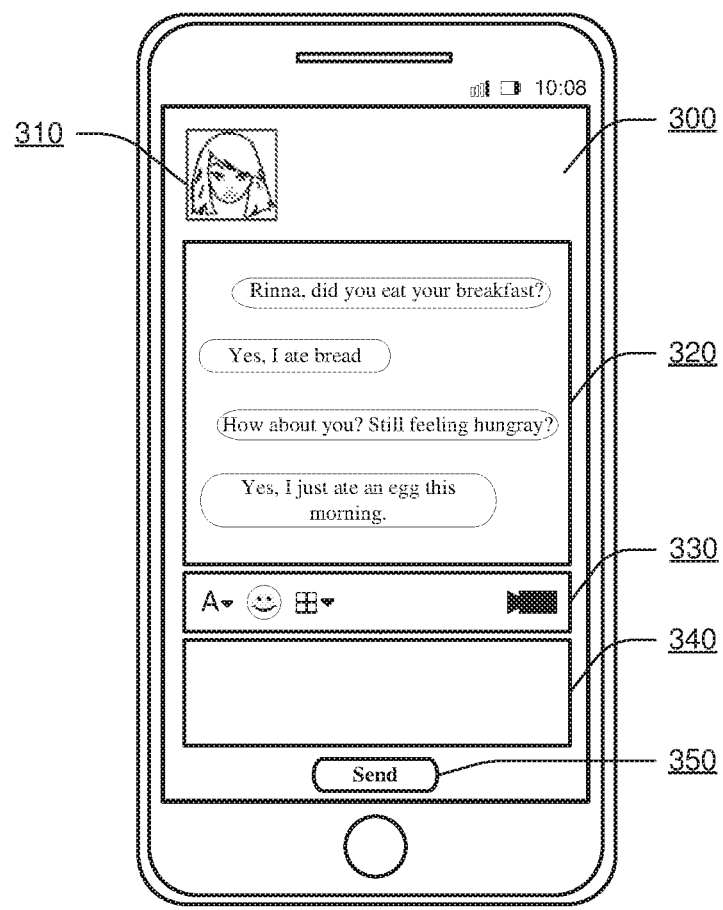
FIG. 3 illustrates an exemplary user interface according to an embodiment.

FIG. 3 illustrates an exemplary user interface 300 according to an embodiment.

The user interface 300 is included in a terminal device, and may comprise a chatbot icon 310, a presentation area 320, a control area 330 and an input area 340. The chatbot icon 310 may be a photo or picture representing the chatbot. The presentation area 320 displays a chat window that contains messages and responses in a session between a user and the chatbot. The control area 330 includes a plurality of virtual buttons for the user to perform message input settings. For example, the user may select to make a voice input, attach image files, select emoji symbols, make a screenshot of the current screen, activate camera, etc. through the control area 330. The input area 340 is used by the user for inputting messages. For example, the user may type text through the input area 340. The user interface 300 may further comprise a virtual button 350 for confirming to send input messages. If the user touches the virtual button 350, the messages input in the input area 340 may be sent to the presentation area 320.

It should be appreciated that all the elements and their layout shown in FIG. 3 are exemplary. Depending on specific application requirements, the user interface in FIG. 3 may omit or add any elements, and the layout of the elements in the user interface in FIG. 3 may also be changed in various approaches. For example, although the messages and responses are shown in a form of text in the presentation area 320, the messages and responses may also be in a form of speech. Accordingly, the chatbot and the user may chat by voices.

The following discussions will take "artwork" as an example of an object of interest. Herein, "artwork" may refer to various works by artists, e.g., paintings, sculptures, etc. It should be appreciated that, under the same or similar inventive concepts, all the processes, methods, algorithms, architectures, etc. discussed below in connection with "artwork" can also be similarly applied to any other types of object, e.g., cultural relics, science and technology exhibits, photography works, etc.

As discussed above, various knowledge graphs may be established. According to major contents in knowledge graphs, the knowledge graphs in the art domain may comprise artwork centered knowledge graph, artist centered knowledge graph, location centered knowledge graph, etc. These knowledge graphs may be established based on knowledge records on various knowledge sources, e.g., knowledge-style websites, partner's official websites, etc.

The artwork centered knowledge graph may comprise various knowledge information related to an artwork, e.g., image representations of the artwork, who made the artwork, when was the artworks made, what are included in the artwork, etc.

Figure 4:
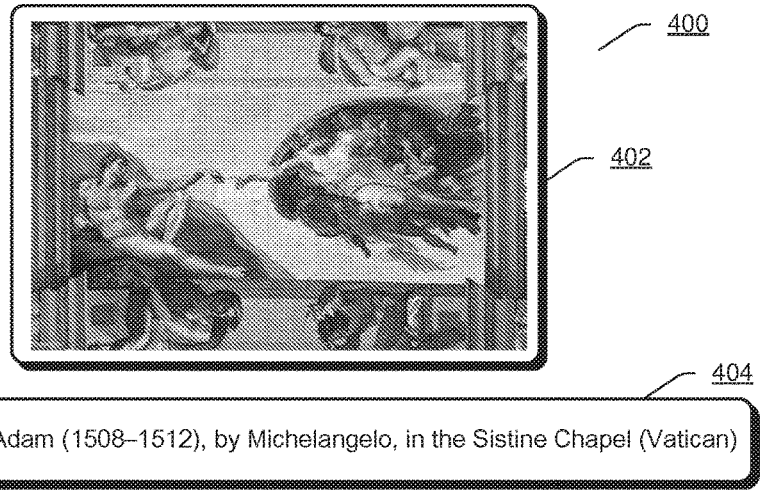
FIG. 4 illustrates an exemplary knowledge record for constructing an artwork centered knowledge graph according to an embodiment.

FIG. 4 illustrates an exemplary knowledge record 400 for constructing an artwork centered knowledge graph according to an embodiment. The knowledge record 400 comprises an image representation 402 of a painting. The knowledge record 400 further comprises a text description 404 of the painting, such as "The Creation of Adam (1508-1512), by Michelangelo, in the Sistine Chapel (Vatican)".

In an implementation, one or more heuristic rules may be applied for extracting knowledge information related to the painting from the text description 404.

Time information is frequently recited in brackets, and the time information may be in a form of year, date, or even hour, minute or second. This is a clue to determine time information from the text description 404. In this example, the "time" information is "1508-1512", which is the year period that the painting was drawn.

Name of a piece of artwork frequently occurs at the beginning of a text description, and may be followed by bracketed time information. In this example, the name of the painting may be determined as "The creation of Adam".

The keyword "by" is frequently followed by an artist of an artwork. In this example, the artist of the painting may be determined as "Michelangelo".

The keyword "in" is a clue for location information. In this example, the "location" information may be determined as "Sistine Chapel" located in "Vatican".

In another implementation, dependency parsing may be applied on the text description 404 for extracting knowledge information related to the painting. Compared with the heuristic rules-based approach, this dependency parsing-based approach is less time-consuming and does not need to predetermine a plenty of heuristic rules so as to cover so many expression modes in natural language sentences.

Figure 5:
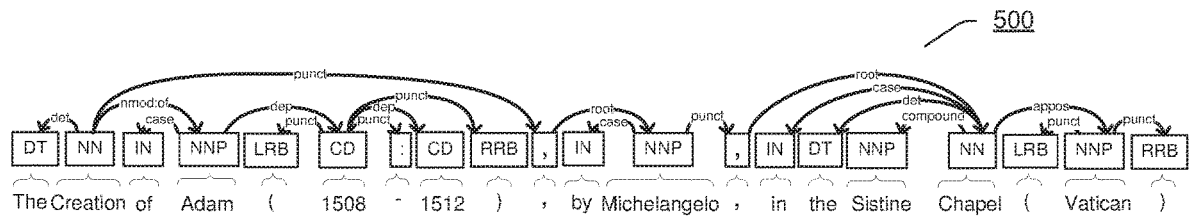
FIG. 5 illustrates exemplary dependency parsing according to an embodiment.

FIG. 5 illustrates exemplary dependency parsing 500 on the text description 404 according to an embodiment.

Through the dependency parsing 500, words related to knowledge information may be identified. For example, "1508" and "1512" are annotated as "CD" (Cardinal Number), "Michelangelo" is annotated as "NNP" indicating a proper noun, "Sistine Chapel" is annotated as "NNP+NN" indicating a named entity, "Vatican" is annotated as "NNP", etc. Moreover, a set of simple heuristic rules that is based on dependency parsing may be defined. For example, CD-annotated words are time-sensitive and may correspond to time information, NNP-annotated words are proper nouns or named entities and may correspond to names or locations, etc. Through combing the dependency parsing and the set of simple heuristic rules, knowledge information related to the painting may be obtained. This dependency parsing-based approach is not dependent on word-order in a text description, and is more robust at knowledge information extracting.

Figure 6:
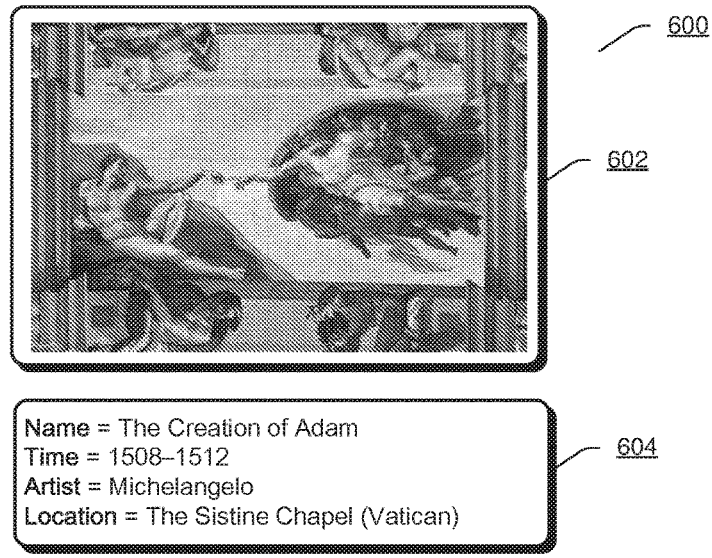
FIG. 6 illustrates an exemplary artwork centered knowledge graph according to an embodiment.

FIG. 6 illustrates an exemplary artwork centered knowledge graph 600 according to an embodiment. The artwork involved in FIG. 6 is a painting named "The Creation of Adam", and the artwork centered knowledge graph 600 may comprise knowledge information related to the painting "The Creation of Adam". The artwork centered knowledge graph 600 is generated from the knowledge record 400 in FIG. 4 based on the heuristic rules-based approach and/or the dependency parsing-based approach as discussed above.

The artwork centered knowledge graph 600 may comprise an image representation 602 which is extracted from the image representation 402 of the knowledge record 400. The artwork centered knowledge graph 600 may further comprise an attribute list 604 which contains a plurality of attributes of the artwork and may be extracted from the text description 404 of the knowledge record 400. For example, the attribute list 604 may comprise "Name=The Creation of Adam", "Time=1508-1512", "Artist=Michelangelo", "Location=The Sistine Chapel (Vatican)", etc. It can be seen that the attributes in the attribute list 604 are organized in a "key-value" format, wherein "key" indicates attribute name and "value" indicates attribute content. For example, for the key "Name", a value for the key "Name" is "The Creation of Adam".

The attribute list 604 in FIG. 6 is exemplary, and more or less attributes may be included in the attribute list 604. For example, if an emotion analysis is applied on the image representation 402, then a corresponding emotion category of the painting may be included in the attribute list 604.

Moreover, it should be appreciated that the form of the artwork centered knowledge graph 600 in FIG. 6 is exemplary, and this disclosure is not limited to any specific organizing forms of knowledge information in the knowledge graph. For example, all the knowledge information may also be organized in a chart form, wherein the chart is formed by a plurality of nodes. Each node is linked to the name of the artwork through an edge, wherein the edge indicates attribute name and the node indicates attribute content.

The artist centered knowledge graph may comprise various knowledge information related to an artist, e.g., a portrait of the artist, born information of the artist, notable works of the artist, etc.

In an implementation, a heuristic rules-based approach may be applied for extracting knowledge information related to the artist. Usually, some knowledge-style websites may comprise text or image introductions of famous persons, e.g., artists. As for text introductions, a set of heuristic rules may be applied so as to extract personal information of the artist, e.g., born date, born location, notable works, etc. This process is similar with the process of generating the artwork centered knowledge graph based on heuristic rules as discussed above.

Figure 7A:
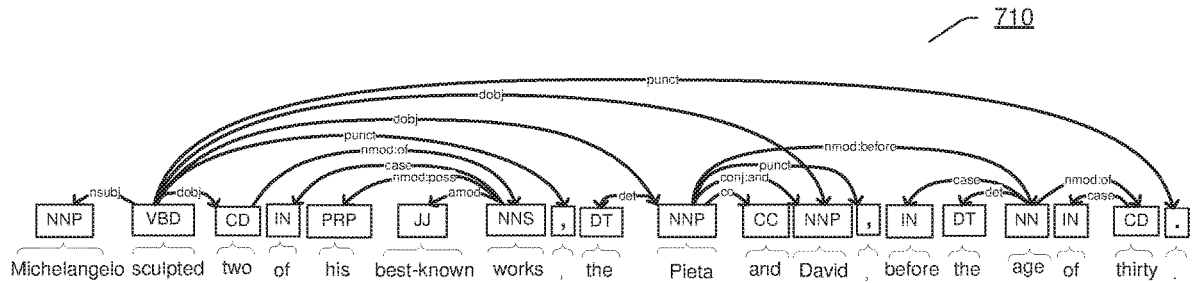
FIG. 7A illustrates exemplary dependency parsing according to an embodiment.

In another implementation, dependency parsing may be applied on the text introductions for extracting knowledge information related to the artist. FIG. 7A illustrates exemplary dependency parsing 710 according to an embodiment. The dependency parsing 710 is performed on an exemplary text sentence "Michelangelo sculpted two of his best-known works, the Pieta and David, before the age of thirty". A plurality of dependency relations may be obtained in FIG. 7A. For example, the dependency relation between "Michelangelo" and "sculpted" is denoted as "nsubj" which indicates a "noun subjective argument" relation, the dependency relation between "sculpted" and "two of his best-known works", "the Pieta", "David" is denoted as "nsubj" which indicates a "direct object argument" relation. Based on the above dependency relations, it may be determined that "the Pieta" and "David" are two notable works by "Michelangelo". In the similar way, other knowledge information related to artists may be also be extracted through dependency parsing.

Figure 7B:
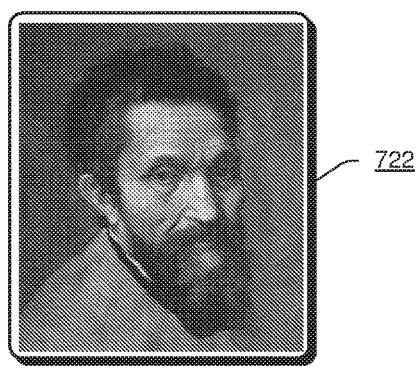
FIG. 7B illustrates an exemplary artist centered knowledge graph according to an embodiment.

FIG. 7B illustrates an exemplary artist centered knowledge graph 720 according to an embodiment. The artist centered knowledge graph 720 corresponds to the artist "Michelangelo", and comprises a portrait 722 of Michelangelo and an attribute list 724. The attribute list 724 contains a plurality of attributes of the artist that are organized in a "key-value" form. For example, for a key "Notable work", a value for the key is a group of strings, including "David", "the Pieta", "The Last Judgment" and "Sistine Chapel Ceiling".

It should be appreciated that the attribute list 724 in FIG. 7B is exemplary, and more or less attributes may be included in the attribute list 724. Moreover, the knowledge information in the artist centered knowledge graph 720 in FIG. 7B may also be organized in any other forms, e.g., in a chart form.

The location centered knowledge graph may comprise various knowledge information related to a location, e.g., what artworks were made at the location, what artworks are exhibited at the location, styles of artwork at the location, artists associated with the location, etc. The location centered knowledge graph may be generated based on a heuristic rules-based approach and/or a dependency parsing-based approach similarly as discussed above. Taking "British Museum" as an example of location, a corresponding location centered knowledge graph may comprise names of artworks exhibited at the British Museum, historical art events happened at the British Museum, etc. Taking "Sistine Chapel in Vatican" as an example of location, a corresponding location centered knowledge graph may comprise name of a piece of artwork "Sistine Chapel Ceiling" located at the Sistine Chapel, name of an artist "Michelangelo" who drew the painting "Sistine Chapel Ceiling" at the Sistine Chapel, time information "High Renaissance" at which period the Sistine Chapel was focused because of some famous High Renaissance artworks located in it, etc.

It should be appreciated that the artwork centered knowledge graph, the artist centered knowledge graph and the location centered knowledge graph as discussed above may also be combined or linked together. For example, if the artwork name "Sistine Chapel Ceiling" is included in a location centered knowledge graph aiming at the location "Sistine Chapel", and meanwhile the artwork name "Sistine Chapel Ceiling" is also included in an artist centered knowledge graph aiming at the artist "Michelangelo", then "Sistine Chapel Ceiling" may become a node for linking the location centered knowledge graph aiming at the location "Sistine Chapel" and the artist centered knowledge graph aiming at the artist "Michelangelo". The artwork centered knowledge graph, the artist centered knowledge graph, the location centered knowledge graph or the combination thereof may be used by the chatbot for answering a user's questions.

Figure 8:
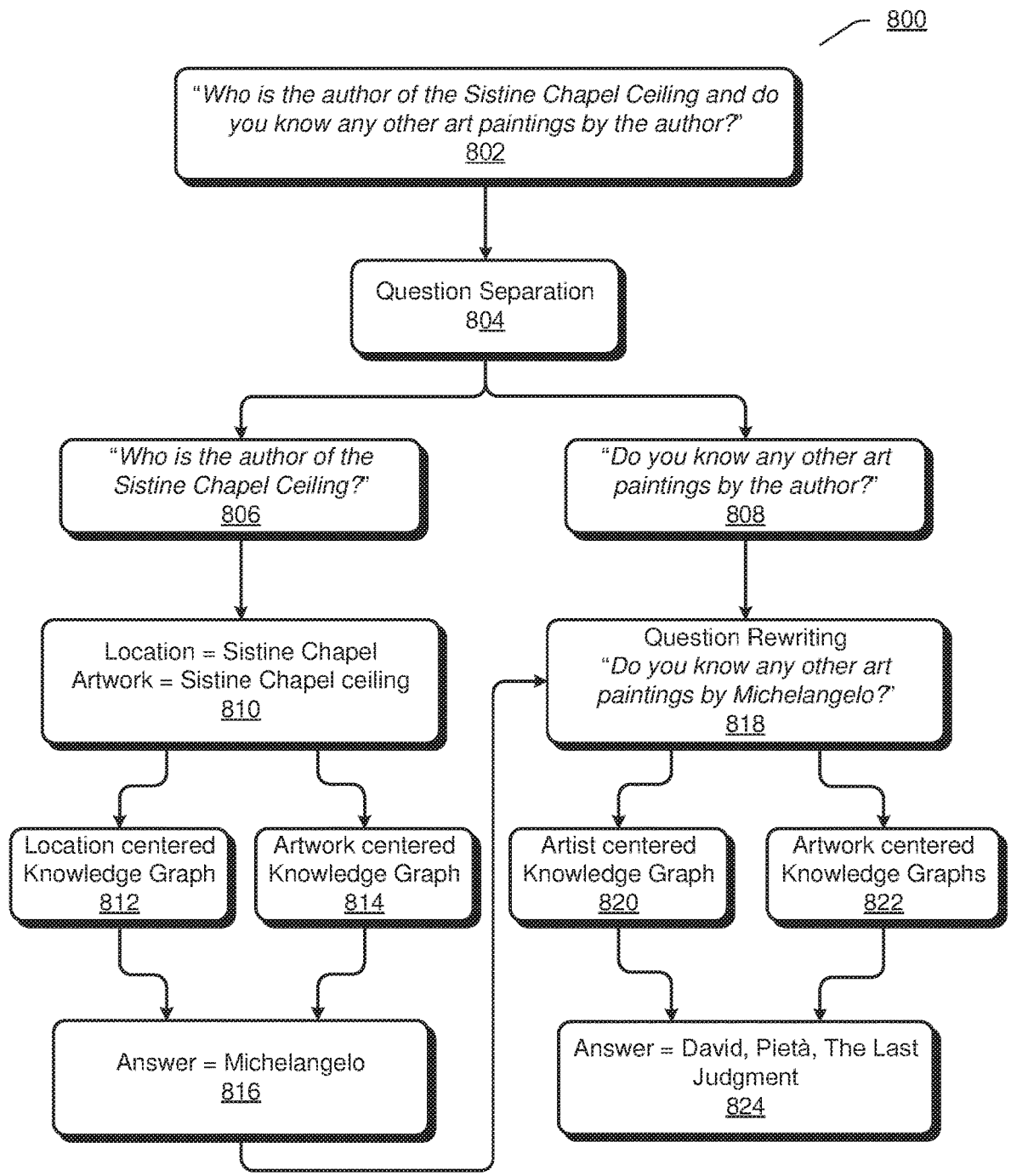
FIG. 8 illustrates an exemplary question answering process according to an embodiment.

FIG. 8 illustrates an exemplary question answering process 800 according to an embodiment. The process 800 may be performed for answering a user's questions based on knowledge graphs.

At 802, an exemplary message "Who is the author of the Sistine Chapel Ceiling and do you know any other art paintings by the author?" may be received from the user.

It can be determined that the message actually comprises two questions. Thus, at 804, a question separation operation may be performed to obtain two questions, e.g., a question 806 of "Who is the author of the Sistine Chapel Ceiling" and another question 808 of "Do you know any other art paintings by the author?"

At 810, the question 806 may be parsed to obtain key information in the question 806. For example, it may be determined that the question 806 involves a location "Sistine Chapel" and an artwork "Sistine Chapel Ceiling".

Based on the key information obtained at 810, a location centered knowledge graph 812 aiming at the location "Sistine Chapel" and an artwork centered knowledge graph 814 aiming at the artwork "Sistine Chapel Ceiling" may be retrieved. The knowledge graphs 812 and 814 may be pre-established based on public knowledge sources or partner knowledge sources.

The location centered knowledge graph 812 may comprise knowledge information about the location "Sistine Chapel", such as, artworks that were made at the Sistine Chapel, artists associated with the Sistine Chapel, etc. The artwork centered knowledge graph 814 may comprise knowledge information about the artwork "Sistine Chapel Ceiling", such as, an artist who made the artwork, time information when the artwork was made, etc. Through matching with knowledge information in the knowledge graphs 812 and 814, it may be determined that the author or artist of the artwork "Sistine Chapel Ceiling" is "Michelangelo", which forms an answer 816 for the question 806.

The answer 816 may be further used for rewriting the question 808 at 818. For example, the question 808 may be rewritten as "Do you know any other art paintings by Michelangelo?". The question rewriting at 818 may improve semantic completeness of the question 808, such as, "author" in the question 808 is replaced by "Michelangelo", which may facilitate to find an appropriate answer.

Since the rewritten question involves key information about "Michelangelo" and "art paintings", an artist centered knowledge graph 820 aiming at "Michelangelo" and a set of artwork centered knowledge graphs 822 may be retrieved. The knowledge graphs 820 and 822 may be pre-established based on public knowledge sources or partner knowledge sources.

The artist centered knowledge graph 820 may comprise knowledge information about the artist "Michelangelo", such as, born information of Michelangelo, notable works by Michelangelo, etc. The set of artwork centered knowledge graphs 822 may comprise a plurality of artwork centered knowledge graphs, each of which aims at a certain piece of artwork and comprises knowledge information of this artwork, such as, an artist who made this artwork, time information when this artwork was made, etc. Through matching with knowledge information in the knowledge graphs 820 and 822, it may be determined that the artist "Michelangelo" also makes some other artworks, e.g., "David", "the Pieta", "The Last Judgment", etc., which form an answer 824 for the question 808.

It should be appreciated that all the operations in the process 800 are exemplary, and according to actual requirements, any operations may be omitted from the process 800. For example, if a question from the user is already semantically complete, the question rewriting operation at 818 may also be omitted. Moreover, although the answers 816 and 824 are shown as only including contents totally aiming at respective questions, any other relevant contents may also be included in the answers so as to enhance the user's interest of chatting and improve the user's experience. For example, when providing the answer "Michelangelo" for the question "Who is the author of the Sistine Chapel Ceiling", the chatbot may also additionally tell the user that "He is known not only for painting but also for sculpture, architecture and poetry". Such additional contents may be retrieved from, e.g., the artist centered knowledge graph 820 aiming at "Michelangelo".

The embodiments of the present disclosure may involve performing emotion analysis on text, image, etc. so as to obtain emotion information. Accordingly, a text-to-emotion classifying model and an image-to-emotion classifying model may be established respectively for performing the emotion analysis.

Figure 9:
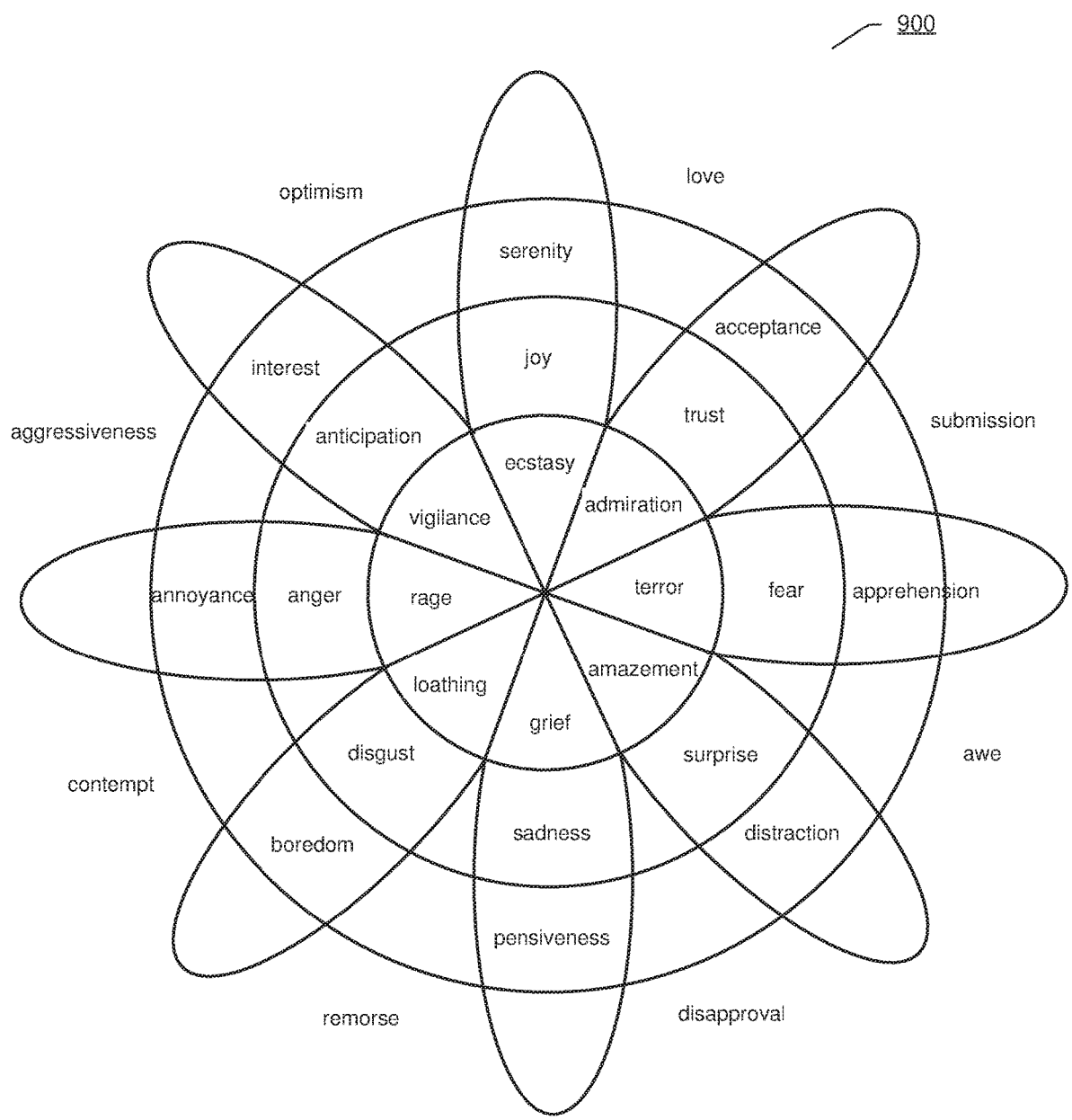
FIG. 9 illustrates an exemplary emotion set according to an embodiment.

Various dimensions of emotion may be adopted in the embodiments. For example, FIG. 9 illustrates an exemplary emotion set 900 according to an embodiment. The emotion set 900 is also known as Plutchik's wheel of emotions.

As shown in FIG. 9, eight "basic" emotions are defined, including: joy, trust, fear, surprise, sadness, disgust, anger and anticipation. Each basic emotion is defined with three strength levels, including "weak", "middle" and "strong". For example, as for the basic emotion "anger", an emotion with weak strength is "annoyance", an emotion of middle strength is "anger", and an emotion with strong strength is "rage". The emotion with weak strength and the emotion with strong strength may be viewed as variants of the corresponding basic emotion.

Moreover, eight "combined" emotions which do not have "strength" are also defined in FIG. 9, including: love, submission, awe, disapproval, remorse, contempt, aggressiveness and optimism. Each combined emotion is defined based on two adjacent basic emotions. For example, the combined emotion "love" is defined based on the basic emotion "joy" and the basic emotion "trust".

Therefore, there are total 32 types of emotions included in the emotion set 900. However, it should be appreciated that the embodiments of the present disclosure are not limited to adopt the emotions in the emotion set 900, and any other types of emotion set defining more or less emotions may be also adopted.

Figure 10:
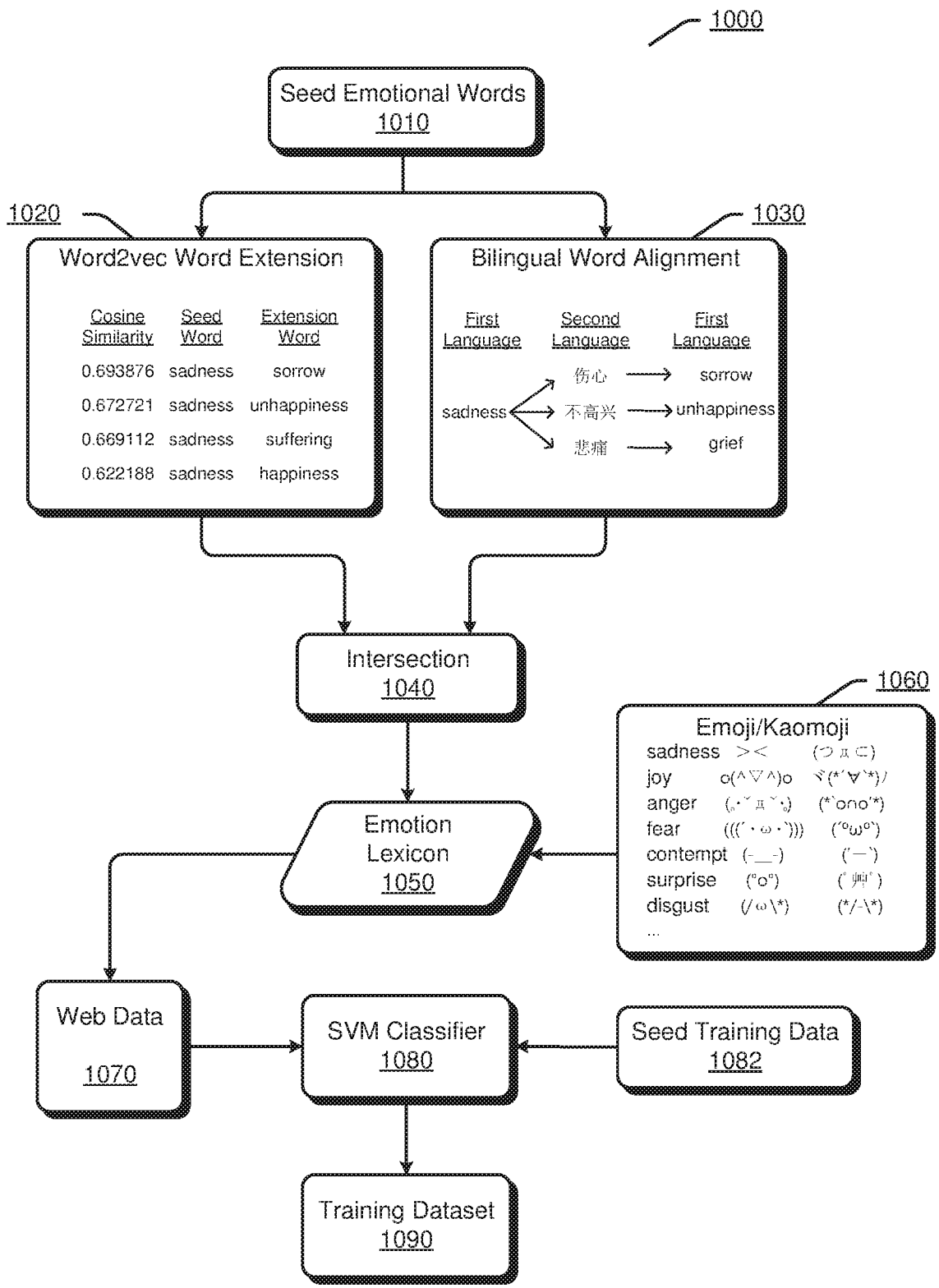
FIG. 10 illustrates an exemplary process for obtaining training dataset for emotion analysis according to an embodiment.

In order to train the text-to-emotion classifying model, large-scale training dataset in a form of <text, emotion category> shall be obtained, wherein "emotion category" may refer to one of the 32 emotions in the emotion set 900, or refer to one of the 8 basic emotions together with a corresponding strength level or one of the 8 combined emotions. FIG. 10 illustrates an exemplary process 1000 for obtaining training dataset for emotion analysis according to an embodiment. The process 1000 may be performed for generating an emotion lexicon by extending seed emotional words, and further determining a training dataset by using the emotion lexicon.

At 1010, seed emotional words may be obtained. Herein, the seed emotional words may include emotional words corresponding to each of the 32 emotions. For example, the seed emotional words may include a plurality of words corresponding to the emotion "joy", such as, "happiness", "gladness", "pleasure", etc. The seed emotional words may be obtained from existing manually-constructed emotion lexicons that contain words with manually-labeled emotional polarities. These manually-constructed emotion lexicons can only provide a limited number of seed emotional words that are not enough for obtaining a training dataset for the emotion analysis.

At 1020, a Word2vec word extension may be performed based on the seed emotional words so as to extend the seed emotional words. A Word2vec cosine similarity score for each seed emotional word and a word from a corpus may be computed. In this way, a number of words, from the corpus, with computed scores may be collected for each emotional word, and then a plurality of top-ranked words may be determined as extension to the seed emotional word. For example, as shown in FIG. 10, for the seed emotional word "sadness", extension words "sorrow", "unhappiness", "suffering", "happiness", etc. may be determined based on the computed Word2vec cosine similarity scores.

It should be appreciated that Word2vec cosine similarity score is computed based on, such as, positions of words in sentences. Thus, the Word2vec word extension cannot ensure that all the extension words have a similar semantic meaning with the corresponding seed emotional word. For example, in FIG. 10, "happiness" is determined as an extension word to the seed emotional word "sadness", however, these two words have different semantic meanings. Thus, the process 1000 further comprises a pruning mechanism, which is based on bilingual word alignment, for removing those extension words having different semantic meanings or weak semantic relevance from corresponding seed emotional words.

At 1030, bilingual word alignment may be performed. The bilingual word alignment may be used for finding semantically relevant words to a seed word through a round-trip translating between two different languages. A seed emotional word in a first language may be translated into words in a second language. For example, the seed emotional word "sadness" in English may be translated into words "伤心", "不高兴" and "悲痛" in Chinese. Then, the words in the second language may be translated back into words in the first language. For example, the words "伤心", "不高兴" and "悲痛" in Chinese may be translated back into words "sorrow", "unhappiness" and "grief" in English. Thus, a list of words "sorrow", "unhappiness" and "grief" may be obtained through the bilingual word alignment for the seed emotional word "sadness".

At 1040, an intersection operation may be performed on the extension words obtained by the Word2vec word extension at 1020 and the word list obtained by the bilingual word alignment at 1030. The intersection operation may be used for removing those extension words, obtained by the Word2vec word extension, having different semantic meanings or weak semantic relevance from corresponding seed emotional words. For example, in FIG. 10, through the intersection operation, the words "sorrow" and "unhappiness" may be retained, while the word "suffering" having weak semantic relevance from "sadness" and the word "happiness" having different semantic meanings from "sadness" are removed.

The retained words through the intersection operation may be appended to an emotion lexicon 1050. In an implementation, words in the emotion lexicon 1050 may be further added by corresponding emoticons, e.g., emoji or kaomoji. At 1060, emoji or kaomoji may be collected from the network for each type of emotions. For example, for the emotion "sadness", its corresponding emoticons may include, such as, "><", "(つд⊂)", etc. Accordingly, these emoticons may be appended to the words "sadness", "sorrow" and "unhappiness" corresponding to the emotion "sadness" in the emotion lexicon 1050.

As discussed above, the emotion lexicon 1050 is established by performing Word2vec word extension and bilingual word alignment on seed emotional words, and may include much more words than the manually-constructed emotion lexicons. The emotion lexicon 1050 may be used for crawling, from web data 1070, text sentences that contain at least one word in the emotion lexicon 1050. These crawled text sentences may be used as candidate training data.

In some cases, the candidate training data may comprise some interference sentences that have obscure emotions or are difficult to identify emotions. An exemplary interference sentence may comprise a word "not" or its equivalents, which may switch from an original emotion to a contrary emotion. Another exemplary interference sentence may comprise both positive words and negative words in a mixture way, such as, "praise first and then criticize". Moreover, in some cases, there may be a gap between the "strength" of one seed emotional word and the "strength" of one sentence that contains the seed emotional word. That is, the sentence is not ensured to follow exactly the same strength of the seed emotional word. For example, for the seed emotional word "anger", the strength of "anger" is "middle". However, in a sentence alike "he was extremely angry, and he put the trigger of the gun", the emotion of the total sentence should be annotated as "strong" anger, i.e., an emotion "rage" which has a strong strength, instead of the emotion "anger" which only has a middle strength. Besides, a seed emotional word may extend some new synonym words that make its strength to be changed from the original seed emotional word.

To alleviate the above problems, a support vector machine (SVM) classifier 1080 may be used for filtering out interference sentences from the candidate training data or correcting improper emotion annotations of some candidate training data. The SVM classifier 1080 may use trigram characters as features. A set of seed training data 1082 may be obtained for training the SVM classifier 1080. For example, the seed training data may comprise 1,000 manually-annotated instances for each emotion. In one case, a sentence in an instance may be annotated by one of the 8 basic emotions or one of the 8 combined emotions, and if one basic emotion is annotated, a strength level shall be further annotated. In another case, a sentence in an instance may be annotated directly by one of the 32 emotions in the emotion set 900.

The SVM classifier 1080 may make a secondary judgment to the candidate training data obtained based on the emotion lexicon 1050. Through the operation of the SVM classifier 1080, those sentences having a relatively high confidence probability in the candidate training data may be finally appended to a training dataset 1090. The training dataset 1090 may be used for training the text-to-emotion classifying model.

It should be appreciated that the operation of Word2vec synonym extension at 1020, the operation of appending emoticons at 1060 and the operation by the SVM classifier 1080 are all optional in the process 1000. Thus, in other implementations, any one or more of these operations may be omitted from the process 1000.

Figure 11:
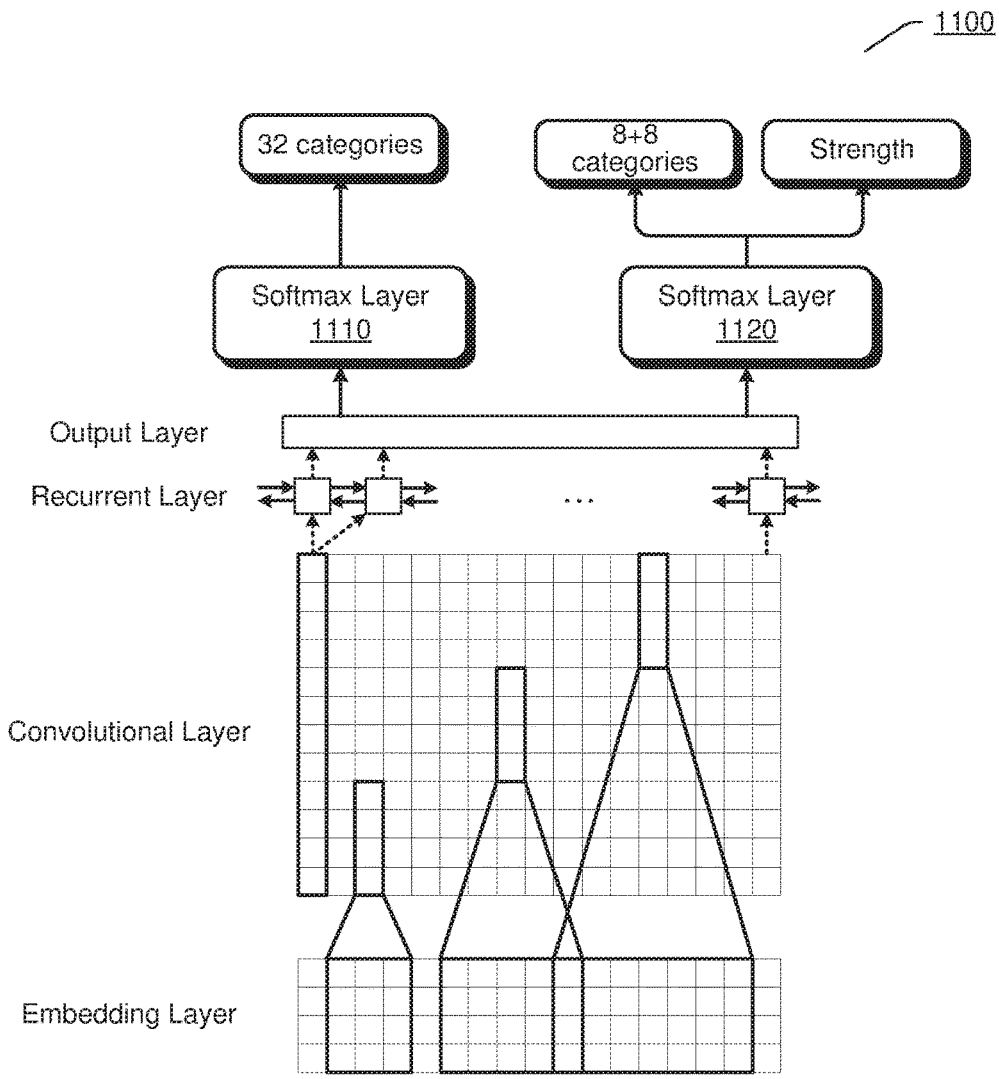
FIG. 11 illustrates an exemplary architecture for performing emotion analysis on text according to an embodiment.

FIG. 11 illustrates an exemplary architecture 1100 for performing emotion analysis on text according to an embodiment. The architecture 1100 may be adopted by the text-to-emotion classifying model which may be trained by the training dataset obtained in FIG. 10.

The architecture 1100 may comprise a character-level Recurrent Convolutional Neural Network (RCNN). The character-level RCNN is capable of encoding both semantic and orthographic information from characters, and may comprise an embedding layer, a convolutional layer, a recurrent layer and an output layer. It should be appreciated that, as for text sentences in a character-style language, e.g., Japanese, Chinese, etc., characters in the sentences may be taken as basic units for embedding, while as for text sentences in a word-style language, e.g., English, words in the sentences, instead of letters, may be taken as basic units for embedding. When the basic units in the embedding layer are "characters", the convolutional layer is to find the best combinations of words each of which is combined by several characters. When the basic units in the embedding layer are "words", the convolutional layer is to find the best combinations of phrases each of which is combined by several words. Although the following discussion aims at the case of "character", similar technical means may also be applied for the case of "word".

The embedding layer may convert a text sentence into a dense vector space, e.g., generating a vector for each character in the sentence.

The convolutional layer may be based on a CNN, and may perform convolution operations on the vectors from the embedding layer, e.g., converting the vectors with various kernel sizes.

Let $Q \in \mathbb{R}^{d*|V|}$ be a character embedding matrix with d being the dimensionality of character embedding and V being a character vocabulary set. It is assumed that a word $w=c_1, \ldots, c_l$, which has l characters $c_j$. Then, a character-level representation of w is given by a matrix $C^w \in \mathbb{R}^{d*l}$, where the j-th column of $C^w$ corresponds to a character embedding for $c_j$ which is further the j-th column of Q. A narrow convolution is applied between $C^w$ and a filter or convolutional function $H \in \mathbb{R}^{d*f}$ with a width f. FIG. 11 shows three exemplary filters with widths f=3, 5 and 7. Then, a bias is added, and a nonlinearity transformation is applied to obtain a feature map $f^w \in \mathbb{R}^{l-f+1}$ The i-th element of $f^w$ may be given as:

$$f^w[i]=\tan h(<C^w[*,i:i+f-1],H>+b) \qquad \text{Equation (1)}$$

where $C^w[*, i:i+f-1]$ is the i-to-(i+f-1)-th columns of $C^w$, and $<A, B>=Tr(AB^T)$ is a Frobenius inner product.

In an implementation, the CNN at the convolutional layer may adopt, such as, a max pooling over time.

The recurrent layer may perform recurrent operations on outputs of the convolutional layer. It should be appreciated that, although FIG. 11 shows bidirectional recurrent operations in the recurrent layer, unidirectional recurrent operations may also be applied in the recurrent layer. The recurrent layer may also be referred to as a recurrent neural network (RNN) layer, which may adopt long-short term memory (LSTM) units. The LSTM may address a learning problem of long distance dependencies and a gradient vanishing problem, through augmenting a traditional RNN with a memory cell vector $c_t \in \mathbb{R}^n$ at each time step. One step of the LSTM takes $x_t, h_{t-1}, c_{t-1}$ as inputs and produces $h_t, c_t$ via the following intermediate calculations:

$$i_t=\sigma(W^i x_t+U^i h_{t-1}+b^i) \qquad \text{Equation (2)}$$

$$f_t=\sigma(W^f x_t+U^f h_{t-1}+b^f) \qquad \text{Equation (3)}$$

$$o_t=\sigma(W^o x_t+U^o h_{t-1}+b^o) \qquad \text{Equation (4)}$$

$$g_t=\tan h(W^g x_t+U^g h_{t-1}+b^g) \qquad \text{Equation (5)}$$

$$c_t=f_t \otimes c_{t-1}+i_t \otimes g_t \qquad \text{Equation (6)}$$

$$h_t=o_t \otimes \tan h(c_t) \qquad \text{Equation (7)}$$

where $\sigma(.)$ and $\tanh(.)$ are elementwise sigmoid and hyperbolic tangent functions, $\otimes$ is an elementwise multiplication operator, and $i_t, f_t, o_t$ denote input gate, forget gate and output gate respectively. When t=1, $h_0$ and $c_o$ are initialized to be zero vectors. Parameters to be trained in the LSTM are the matrices $W^j, U^j$, and the bias vector $b^j$, where $j \in \{i, f, o, g\}$.

The output layer may be configured for passing RNN states from the recurrent layer to a softmax layer 1110 or 1120.

The softmax layer 1110 and the softmax layer 1120 are configured for different emotion classifying strategies. In one strategy, emotion categories may be defined based on 32 emotions in the emotion set 900, including 8 basic emotions with "middle" strength, 8 weak emotions, 8 strong emotions and 8 combined emotions. The softmax layer 1110 may be a full connection layer which outputs an emotion vector corresponding to the 32 emotion categories. In another strategy, emotion categories may be defined based on a combination of emotion and strength. For example, according to the emotion set 900, 8 basic emotions and 8 combined emotions may be defined, wherein each of the 8 basic emotions is further defined with a strength level, while the 8 combined emotions are not defined with any strength level. The softmax layer 1120 may be a full connection layer which outputs an emotion vector corresponding to the 8 basic emotions, strength levels of the 8 basic emotions, and the 8 combined emotions. The emotion vector output by the softmax layer 1110 and the softmax layer 1120 may be construed as emotion information of the input text sentence.

The text-to-emotion classifying model adopting the architecture 1100 may be used for performing emotion analysis on text sentences. For example, when receiving a text message from the user, the chatbot may perform emotion analysis on sentences in the text message through the text-to-emotion classifying model so as to determine the emotion of the user.

As mentioned above, the embodiments of the present disclosure may also adopt the image-to-emotion classifying model to perform emotion analysis on image.

Figure 12:
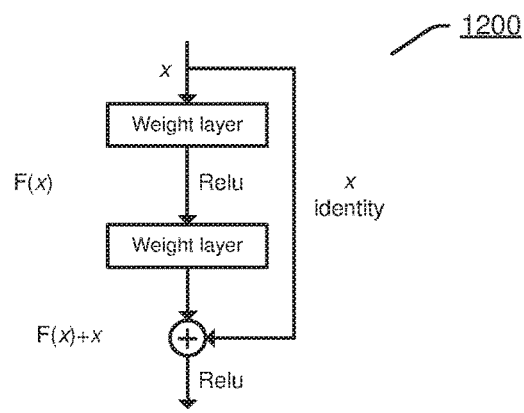
FIG. 12 illustrates an exemplary residual learning block for image encoding according to an embodiment.

Deep neural networks may be adopted for projecting an image into a dense vector. For example, a residual network (ResNet) may be adopted for encoding the image. The ResNet may comprise a plurality of residual learning blocks. FIG. 12 illustrates an exemplary residual learning block 1200 for image encoding according to an embodiment. Formally, as for an input x, a desired underlying mapping may be denoted as H(x), and stacked nonlinear layers may fit another mapping of F(x):=H(x)−x. An original mapping may be recast into F(x)+x. It is hypothesized that it is easier to optimize residual mapping than to optimize original unreferenced mapping. To the extreme, if an identity mapping were optimal, it would be easier to push a residual to zero than to fit the identity mapping by a stack of nonlinear layers. The non-linear active function is a rectified linear unit (relu), which may be defined as: Relu(x)=max(0, x). Based on the residual learning block shown in FIG. 12, a residual network may be established.

Figure 13:
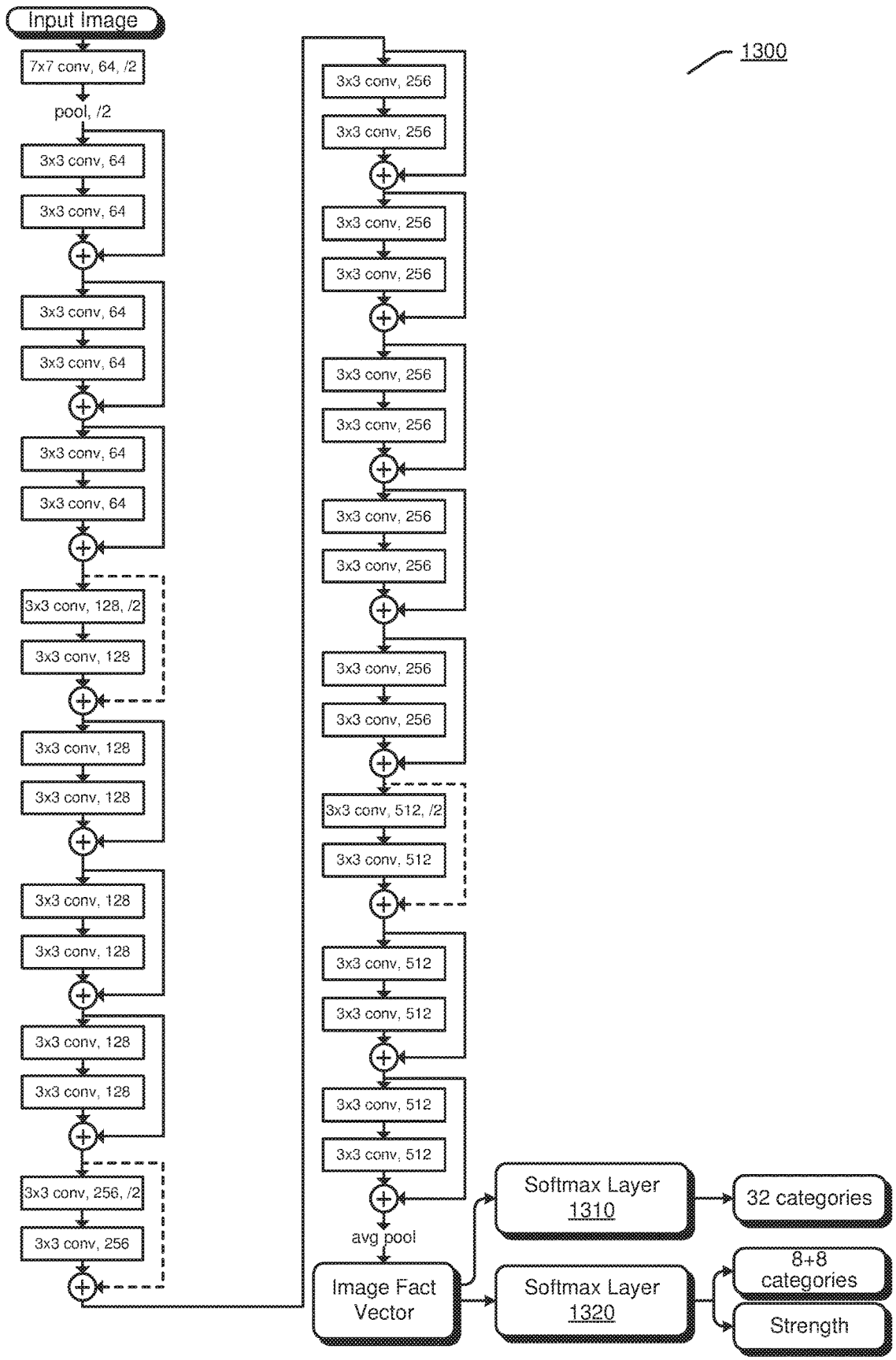
FIG. 13 illustrates an exemplary architecture for performing emotion analysis on image according to an embodiment.

FIG. 13 illustrates an exemplary architecture 1300 for performing emotion analysis on image according to an embodiment. The architecture 1300 may be adopted by the image-to-emotion classifying model.

The architecture 1300 may comprise an exemplary residual network for encoding an input image. The residual network has 34 layers, which may provide a relative good accuracy and fast training/testing. In FIG. 13, for example, "3*3 cony, 64" denotes that there are 64 filters, and each filter has a convolutional kernel or function and is in a scale of 3*3 pixels. "/2" denotes a double stride. "Pool" denotes a pooling operation, and "avg pool" denotes an average pooling operation. Output of the average pooling operation is an image fact vector which is a dense vector representation of the input image. The fact vector may be construed as fact information of the input image.

The image fact vector may be further provided to a softmax layer 1310 and a softmax layer 1320 that are configured according to different emotion classifying strategies. The softmax layer 1310 and the softmax layer 1320 may function in a similar way with the softmax layer 1110 and the softmax layer 1120 in FIG. 11. For example, the softmax layer 1310 may output an emotion vector corresponding to the 32 emotions, and the softmax layer 1320 may output an emotion vector corresponding to the 8 basic emotions, strength levels of the 8 basic emotions, and the 8 combined emotions. The emotion vector output by the softmax layer 1310 or the softmax layer 1320 may be construed as emotion information of the input image.

The image-to-emotion classifying model adopting the architecture 1300 may be used for performing emotion analysis on images. For example, when obtaining an image representation of a piece of artwork, the chatbot may perform emotion analysis on the image representation through the image-to-emotion classifying model so as to determine the emotion category of the artwork.

It should be appreciated that the ResNet is an exemplary technique that can be adopted in image encoding, and any other techniques may be adopted in image encoding, such as, AlexNet, GoogleNet, VGG-Net, etc.

In some embodiments, region of interests (ROIs) of an image may be identified, and the image-to-emotion classifying model may further perform emotion analysis on the ROIs to obtain emotion information of the ROIs. Herein, "ROI" may refer to a face region in an image including a face picture. In some cases, an image may include more than one person, and these persons may have respective emotions. For example, assuming that there are two persons in an image, one person is crying, and the other person is calm and trying to communicate with the crying person. Apparently, face regions of these two persons may represent different emotions. It would be beneficial for understanding what emotion does the total image have, if these two face regions can be identified and an emotion of each face region can be determined.

Figure 14A:
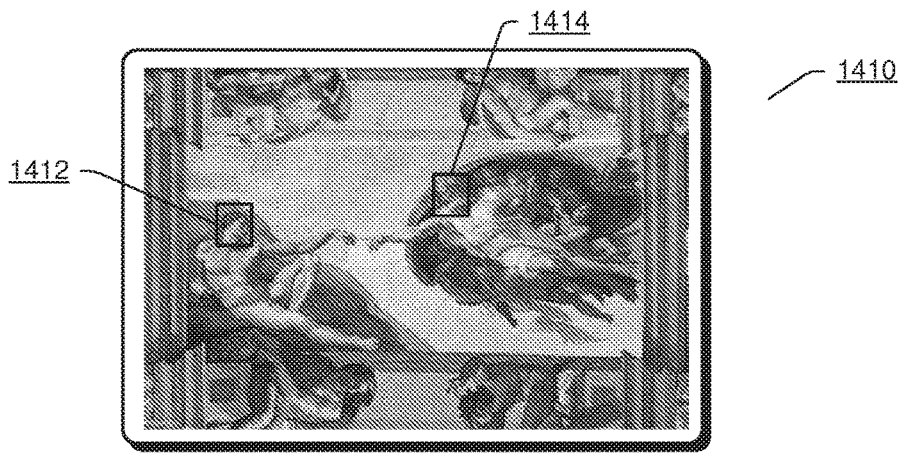
FIG. 14A illustrates exemplary region of interests (ROIs) of an image according to an embodiment.

FIG. 14A illustrates exemplary ROIs of an image 1410 according to an embodiment. Through any existing approaches, two ROIs 1412 and 1414 may be detected in the image 1410. Each of the ROIs 1412 and 1414 is a face region.

Figure 14B:
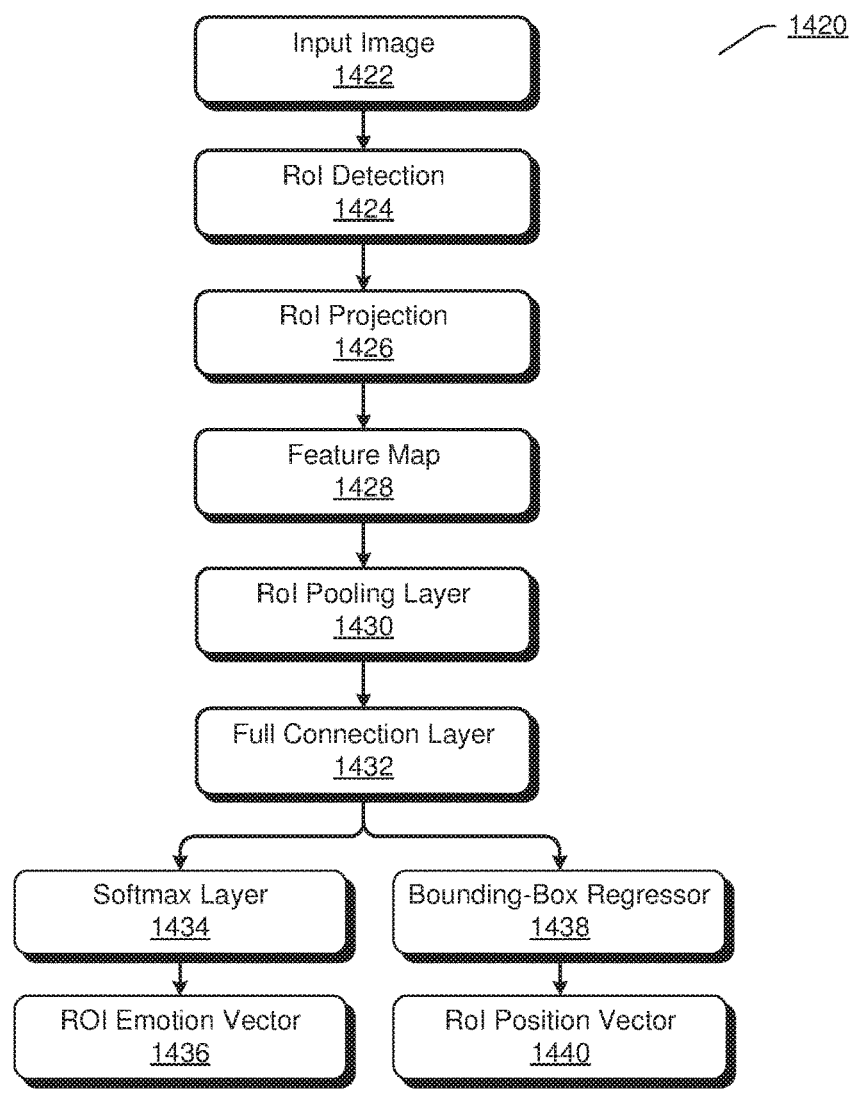
FIG. 14B illustrates an exemplary process for performing emotion analysis on a ROI of an image according to an embodiment.

FIG. 14B illustrates an exemplary process 1420 for performing emotion analysis on a ROI of an image according to an embodiment.

At 1422, an input image may be obtained. At 1424, at least one ROI may be detected from the input image. At 1426, the ROI may be projected into a feature map 1428 through, such as, the ResNet shown in FIG. 13. Then, at 1430, a ROI pooling layer may be used for performing, such as, max pooling on the feature map 1428 so as to convert the feature map 1428 into a small feature map. For example, assuming that the ROI is a h×w rectangular window, this ROI window may be divided into (h/H)×(w/W) sub-windows, and the ROI pooling layer may perform max pooling on values in each sub-window and output a small feature map with a size of H×W. The parameters H and W may be layer hyper-parameters that are independent of any particular ROI. At 1432, the small feature map may be provided to at least one full connection layer which connects to two branches. One branch is to a softmax layer 1434, which may be the same as the softmax layer 1310 or the softmax layer 1320 in FIG. 13 and output an emotion vector 1436 of the ROI. Another branch is to a bounding-box regressor 1438, which may output a ROI position vector 1440 indicating coordinates of a top left corner of the ROI and coordinates of a bottom right corner of the ROI.

In an implementation, emotion vectors of ROIs in an image and an emotion vector of the total image may be combined together as emotion information of the image.

In order to train the image-to-emotion classifying model, large-scale training dataset in a form of <image, emotion category> shall be obtained. In an implementation, the emotion lexicon 1050 in FIG. 10 may be sent to a text-based image searching engine, so as to collect a plenty of images associated with emotional words and/or their strength levels as included in the emotion lexicon. The collected images together with corresponding emotion words and/or their strength levels may be manually judged as "match" or "not match". If there are more than one face occurred in an image, and a "match" judgment has been given for this image, then a ROI, e.g., face region, in the image, which aligns with the emotional word and/or its strength level, may be further manually drawn in the image. The above process for obtaining training dataset may simplify the annotation task and make human level judgment to be easier.

The embodiments of the present disclosure may determine an emotion category of a piece of artwork through the text-to-emotion classification model and/or the image-to-emotion classification model as discussed above. For example, the text-to-emotion classification model may be used for determining the emotion category of the artwork through performing emotion analysis on text description or attributes of the artwork. The image-to-emotion classification model may be used for determining the emotion category of the artwork through performing emotion analysis on an image representation of the artwork. Moreover, the text-to-emotion classification model and the image-to-emotion classification model may also work together to determine the emotion category of the artwork. In some implementations, the determining of the emotion category of the artwork may further consider an emotion of the artist when, such as, the artist was creating the artwork. For example, emotion analysis may be performed on some news, reports, etc. associated with the artist so as to obtain the emotion of the artist. In some implementations, user's emotional feedbacks may be used for determining or updating the emotion category of the artwork. For example, different users may have similar or different emotional feedbacks on the artwork, and emotion analysis may be performed on these emotional feedbacks from the users so as to obtain the emotions of the users on the artwork. The emotions of the users may also be a valuable factor for determining or updating the emotion category of the artwork.

Besides emotion category, the embodiments of the present disclosure may also determine a domain category for a piece of artwork.

Figure 15:
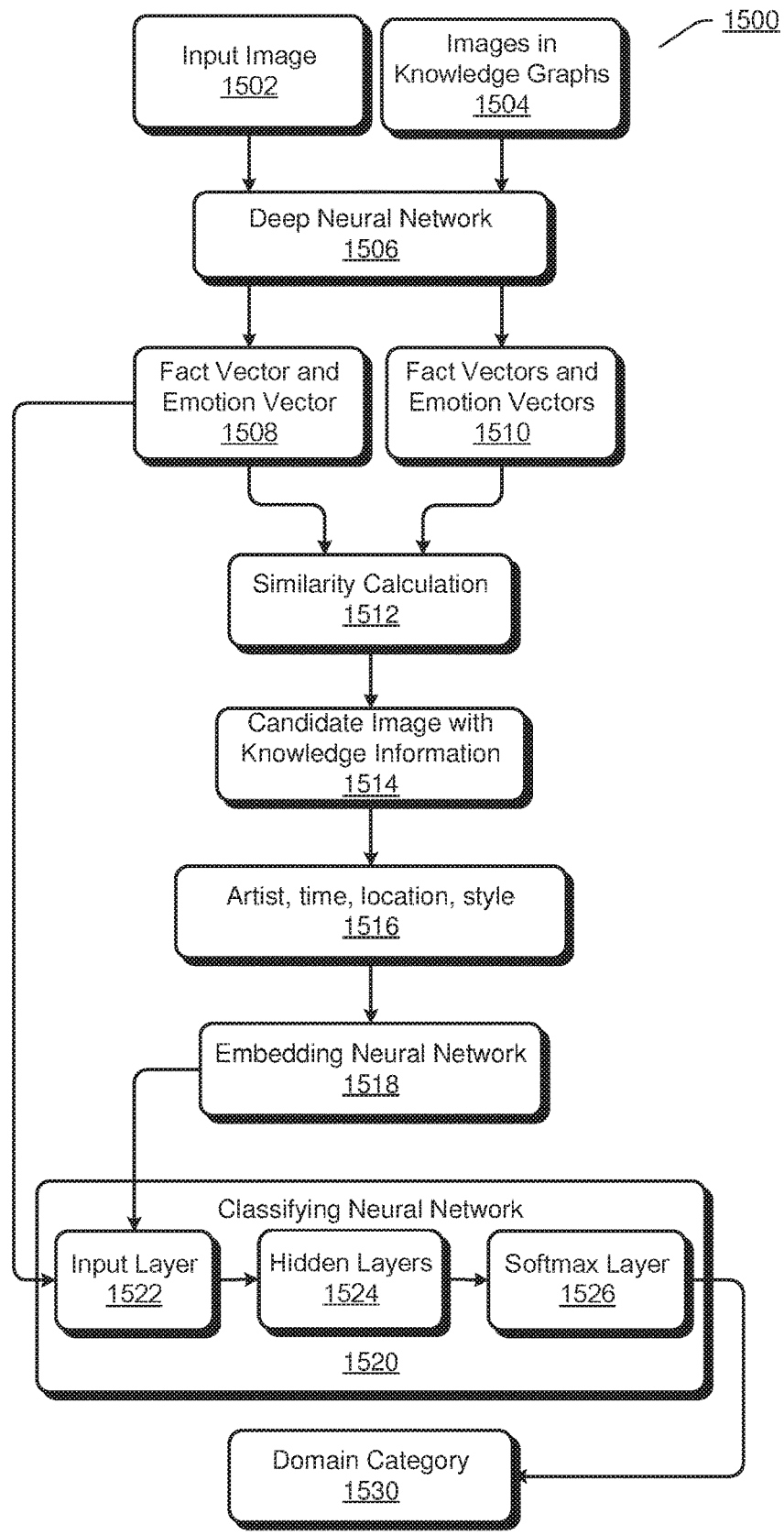
FIG. 15 illustrates an exemplary process for determining a domain category according to an embodiment.

FIG. 15 illustrates an exemplary process 1500 for determining a domain category according to an embodiment.

At 1502, an input image may be obtained. The input image may be an image representation of a piece of artwork. The input image may be provided to a deep neural network at 1506 for obtaining fact and emotion information of the artwork, e.g., fact and emotion vectors 1508 that are obtained based on the input image. The deep neural network may be based on the architecture 1300 in FIG. 13.

At 1504, images in knowledge graphs may be retrieved. The knowledge graphs may comprise at least one of an artwork centered knowledge graph, an artist centered knowledge graph and a location centered knowledge graph. The images in the knowledge graphs may be provided to the deep neural network at 1506 for obtaining fact and emotion information of the images, e.g., fact and emotion vectors 1510.

At 1512, similarity between the fact and emotion vectors 1508 and the fact and emotion vectors 1510 may be calculated. For example, cosine similarity scores may be calculated at 1512.

Based on the similarities between the input image and the images in the knowledge graphs, at least one top-ranked image in the knowledge graph may be determined at 1514 as a candidate image. Knowledge information associated with the candidate image may also be retrieved from the knowledge graphs.

At 1516, information about artist, time, location, style, etc. may be identified from the knowledge information associated with the candidate image. Then, the information about artist, time, location, style, etc. may be provided to an embedding neural network at 1518 for obtaining embedding vectors of the information about artist, time, location, style, etc.

The fact and emotion vectors 1508 and the embedding vectors of the information about artist, time, location, style, etc. may be provided to an input layer 1522 in a classifying neural network 1520. The input layer connects to, such as, two hidden layers 1524 which contain linear layers followed by sigmoid non-linear activation functions. Then a softmax layer 1526 may predict a domain category 1530 of the artwork.

A domain category classifier may be used for determining a domain category according to the process 1500. The domain category classifier may utilize at least one of the following features: fact vector of the input image; emotion vector of the input image; and embedding vectors of the information about artist, time, location, style, etc. associated with the candidate image in the knowledge graphs.

The embodiments of the present disclosure may perform an image-to-text conversion which can convert an image into a text representation. The image may be an image representation of a piece of artwork, and thus through the image-to-text conversion, a text description or comment to the artwork may be generated by the chatbot based on the image representation.

Figure 16:
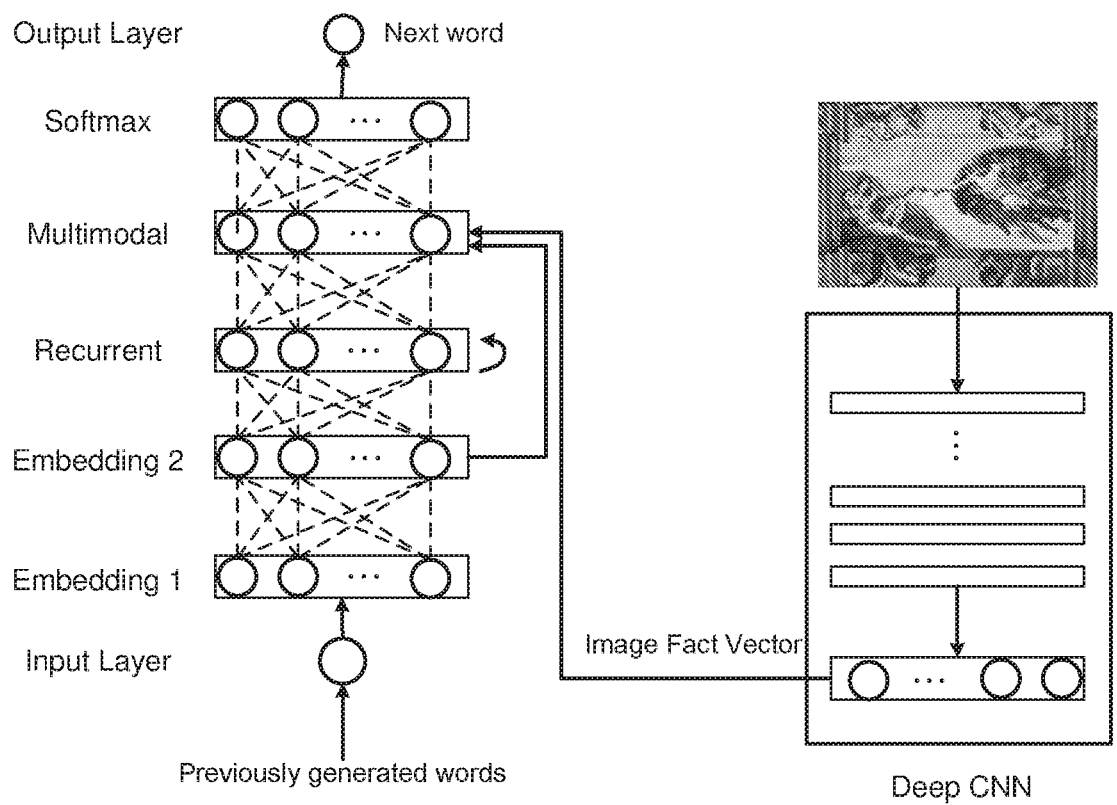
FIG. 16 illustrates an exemplary architecture for performing image-to-text conversion according to an embodiment.

FIG. 16 illustrates an exemplary architecture 1600 for performing image-to-text conversion according to an embodiment. The architecture 1600 is based on a CNN-RNN framework, wherein the deep CNN in the right part of FIG. 16 may be used for obtaining a fact vector of an input image, and the RNN in the left part of FIG. 16 may be used for generating a text sentence. The deep CNN in FIG. 16 may be based on the ResNet in FIG. 13. The fundamental idea of the architecture 1600 is to match an image and a text sentence in a latent semantic space, wherein the image is projected into a dense vector space through the deep CNN and the sentence is projected into another dense vector space through the RNN.

Training data for the architecture 1600 may be in a form of <image, text>. For example, an image representation of the painting "Creation of Adam" and a text sentence of "The God is touching a figure with Adam" which describes the painting may be used as an instance of training data, wherein the image representation is provided to the deep CNN and the text sentence is provided to the RNN. In some cases, sentences in the training data may be broken into words, and all the words may be extracted to form a vocabulary set. Then, words from different sentences may be recombined based on clues from an input image to form a new sentence which is optimized to fit the input image based on generation probabilities.

The sentence generation process of the architecture 1600 may work as follows. The fact vector I of the input image is provided to a multimodal layer of the RNN. A softmax layer may compute probabilities of words in a target vocabulary set, and select at least one word with the maximum probability. In an implementation, beam search may be used for keeping record of the top-B candidate words, wherein B is the beam size. For example, when B is 3, it means that the first 3 words that have the highest probabilities are kept record in the softmax layer.

One or more previously generated words $\{w_1, w_2, \ldots, w_{i-1}\}$ may be input through an input layer of the RNN. A vector w(t) may be obtained through embedding layers 1 and 2 of the RNN. A vector r(t) may be obtained through a recurrent layer of the RNN. The vectors w(t) and r(t) together with the fact vector I of the input image may be provided to the multimodal layer as three input vectors. These three input vectors may be added together at the multimodal layer through:

$$m(t)=g(V_w*w(t)+V_r*r(t)+V_I*I) \quad \text{Equation (8)}$$

wherein, "+" denotes element-wise addition, m denotes the multimodal layer feature vector, g(x) is an element-wise scaled hyperbolic tangent function, and g(x)=1.7159*tan h(2x/3). The function g(x) forces gradients into the most non-linear value range and leads to a faster training process than a basic hyperbolic tangent function.

Based on outputs from the multimodal layer, the softmax layer will select a next word or top-B possible next words from the vocabulary set.

The above generating process may be iteratively performed, and may stop as far as a </s> symbol which denotes the ending of a text sentence.

It should be appreciated that, in some implementations, emotion category of the input image may also be considered in the sentence generating process in FIG. 16. In this case, the vector I of the input image involved in the above discussion may become a combination of the fact vector of the input image and an emotion vector of the input image. Accordingly, the generated text sentence by the architecture 1600 may be an emotional description or comment on the input image. For example, if the input image is about a person who is crying, then the generated text sentence may be alike "This painting tells a sad story" which contains emotional expression indicating the emotion "sadness" conveyed by the painting.

The embodiments of the present disclosure may retrieve an image representation of another artwork that is similar with current artwork of interest in terms of style or category.

Figure 17:
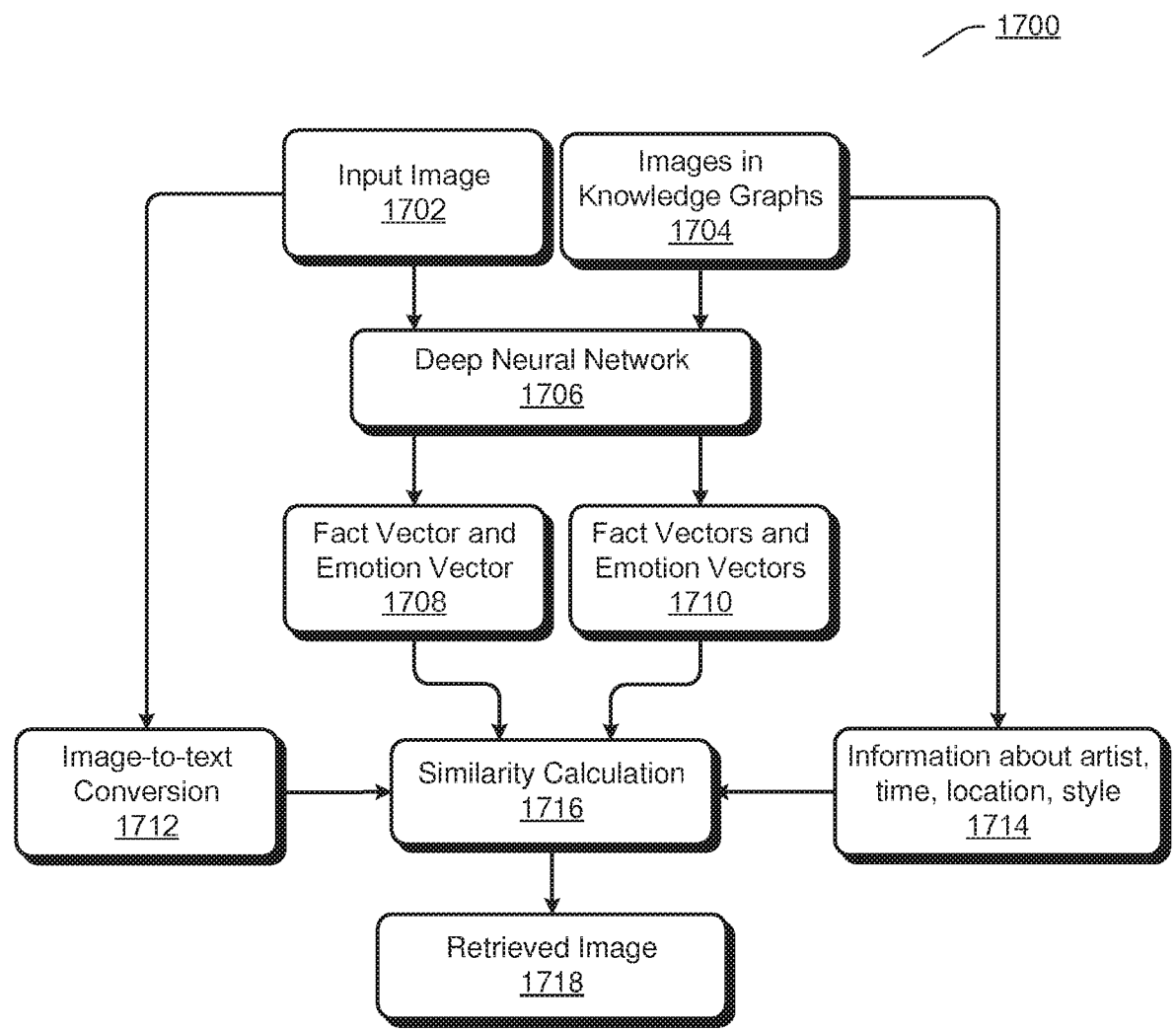
FIG. 17 illustrates an exemplary process for retrieving an image according to an embodiment.

FIG. 17 illustrates an exemplary process 1700 for retrieving an image according to an embodiment.

At 1702, an input image may be obtained. The input image may be an image representation of a piece of artwork. The input image may be provided to a deep neural network at 1706 for obtaining fact and emotion information of the artwork, e.g., fact and emotion vectors 1708 that are obtained based on the input image. The deep neural network may be based on the architecture 1300 in FIG. 13.

At 1704, images in knowledge graphs may be retrieved. The knowledge graphs may comprise at least one of an artwork centered knowledge graph, an artist centered knowledge graph and a location centered knowledge graph. The images in the knowledge graphs may be provided to the deep neural network at 1706 for obtaining fact and emotion information of the images, e.g., fact and emotion vectors 1710.

At 1712, an image-to-text conversion may be performed on the input image so as to obtain a text description for the input image. The image-to-text conversion at 1712 may be based on the image-to-text conversion discussed above in connection with FIG. 16. Then, information about artist, time, location, style, etc. may be identified from the text obtained at 1712.

At 1716, similarity between the input image and the images in the knowledge graphs may be calculated. In an implementation, similarity scores between the fact vector of the input image and the fact vectors of the images in the knowledge graphs may be calculated. In an implementation, similarity scores between the emotion vector of the input image and the emotion vectors of the images in the knowledge graphs may be calculated. In an implementation, similarity scores between the information about artist, time, location, style, etc. identified from the text generated for the input image and information 1714 about artist, time, location, style, etc. associated with the images in the knowledge graphs may be calculated. Based on at least one of the similarity scores calculated above, at least one top-ranked image in the knowledge graphs may be selected at 1718 as a retrieved image.

An image retrieving model may be used for retrieving an image according to the process 1700. The image retrieving model may be a gradient-boosting decision tree (GBDT) learning-to-rank (LTR) model. The image retrieving model may utilize at least one of the following features: similarity scores between the fact vector of the input image and the fact vectors of the images in the knowledge graphs; similarity scores between the emotion vector of the input image and the emotion vectors of the images in the knowledge graphs; and similarity scores between the information about artist, time, location, style, etc. identified from the text generated for the input image and information about artist, time, location, style, etc. associated with the images in the knowledge graphs.

The embodiments of the present disclosure may conduct image-based interactions with a user. In an implementation, the chatbot may change an image representation of a piece of artwork in order to improve the user's interests of chatting and interaction with the chatbot. For example, the chatbot may generate an updated image representation in which a face region in the original image representation of the artwork is changed with a face region in a designated image and the style of the artwork is transferred to the face region in the updated image representation.

Figure 18:
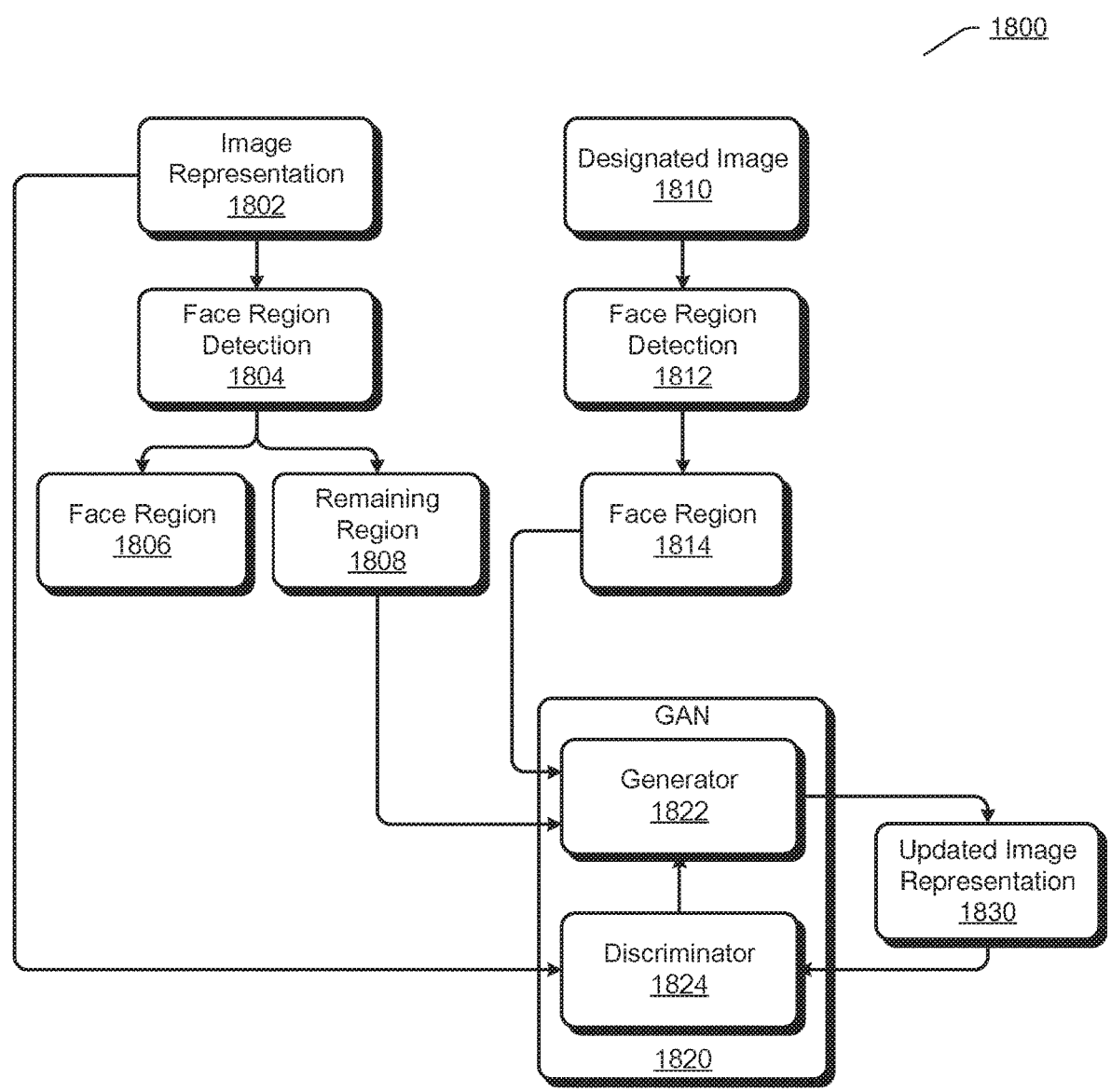
FIG. 18 illustrates an exemplary process for changing an image representation according to an embodiment.

FIG. 18 illustrates an exemplary process 1800 for changing an image representation according to an embodiment.

An image representation 1802 of a piece of artwork may be obtained. The image representation 1802 may be uploaded by the user, or may be retrieved by the chatbot under an indication of the artwork by the user.

At 1804, face region detection may be performed on the image representation 1802, so as to obtain a face region 1806 and a remaining region 1808, wherein the remaining region 1808 may refer to a region in the image representation 1802 where the face region 1806 is excluded.

A designated image 1810 may be obtained. The designated image 1810 may be uploaded by the user, or may be retrieved by the chatbot under an indication of the designated image 1810 by the user. For example, the designated image 1810 may be the user's own photo or other person's photo.

At 1812, face region detection may be performed on the designated image 1810 so as to obtain a face region 1814.

The process 1800 may adopt, such as, a generative adversarial network (GAN) 1820 for generating an updated image representation. The GAN 1820 is advantageous in style transferring from the artwork to the updated image representation. For example, the GAN 1820 may enable a face region in the updated image representation, which is based on the face region 1814, to be in the same or similar style of the original artwork. Moreover, the GAN 1820 is also advantageous in processing boundaries between the face region 1814 and the remaining region 1808 in the updated image representation.

The GAN 1820 may comprise a generator 1822 which is based on an encoder-decoder framework. The face region 1814 and the remaining region 1808 may be provided to the generator 1822 so as to generate the updated image representation 1830. The GAN 1820 may further comprise a discriminator 1824. The updated image representation 1830 and the image presentation 1802 may be input to the discriminator 1824 so as to calculate similarity scores and to back propagate errors for optimization.

The loss function of GAN may be:

$$\min_{G}\max_{D} V(D, G) = \mathbb{E}_{x \sim p_{data}}[\log D(x)] + \mathbb{E}_{x \sim p_z}[\log(1 - D(G(z)))],$$

Equation (9)

where D and G denote the discriminator and the generator respectively. G is optimized to re-produce the true data distribution $p_{data}$ by generating images that are difficult for the discriminator D to distinguish from real images. At the same time, D is optimized to distinguish real images from $p_{data}$ and synthetic images that are generated from G.

In Equation (9), x is a real image following the true data distribution $p_{data}$, z is a noise vector sampled from distribution $p_z$, such as, a uniform distribution, or a one-dimension/multiple-dimension Gaussian distribution. D(x) is the probability that D outputs by giving x as D's input and D(G(z)) is the probability that D assigns to z, which is generated by G. The task of D is to maximize the score in V(D, G) which is to "let real data to be as close to 1 as possible and let synthetic data to be as close to 0 as possible". Furthermore, the task of G is to "cheat" D as much as possible, that is, to minimum D's benefit.

It is easy to extend both G and D by appending additional conditional variables c, yielding G(x, c) and D(x, c). This formulation allows G to generate images conditioned on variables c. For example, the face region 1814 in FIG. 18 is one type of c.

Through the GAN 1820, in the updated image representation 1830, the face region 1806 has been replaced by the face region 1814, e.g., a person's face in the artwork is replaced by the user's face in the designated image. Moreover, the face region 1814 that has been contained in the updated image representation 1830 has been transformed in the same or similar style of the original artwork.

It should be appreciated that, although not shown in FIG. 18, a designated emotion indicated by the user may also be considered in the generation of the updated image representation through the GAN. In one case, the user may desire to change an original emotion category of the artwork into a designated emotion category. For example, assuming that the original emotion category of a painting is "sadness", the user may want to convey an "anger" emotion in the updated image representation. In another case, the user may desire to change an original emotion category of the designated image into another designated emotion category. For example, assuming that the face region in the designated image shows a "fear" emotion, the user may want to convey a "joy" emotion in the updated image representation. The designated emotion may be converted into an emotion vector and provided to the generator of the GAN. Accordingly, this emotion vector may affect the generating of the updated image representation such that the updated image representation may convey the emotion designated by the user.

Figure 19:
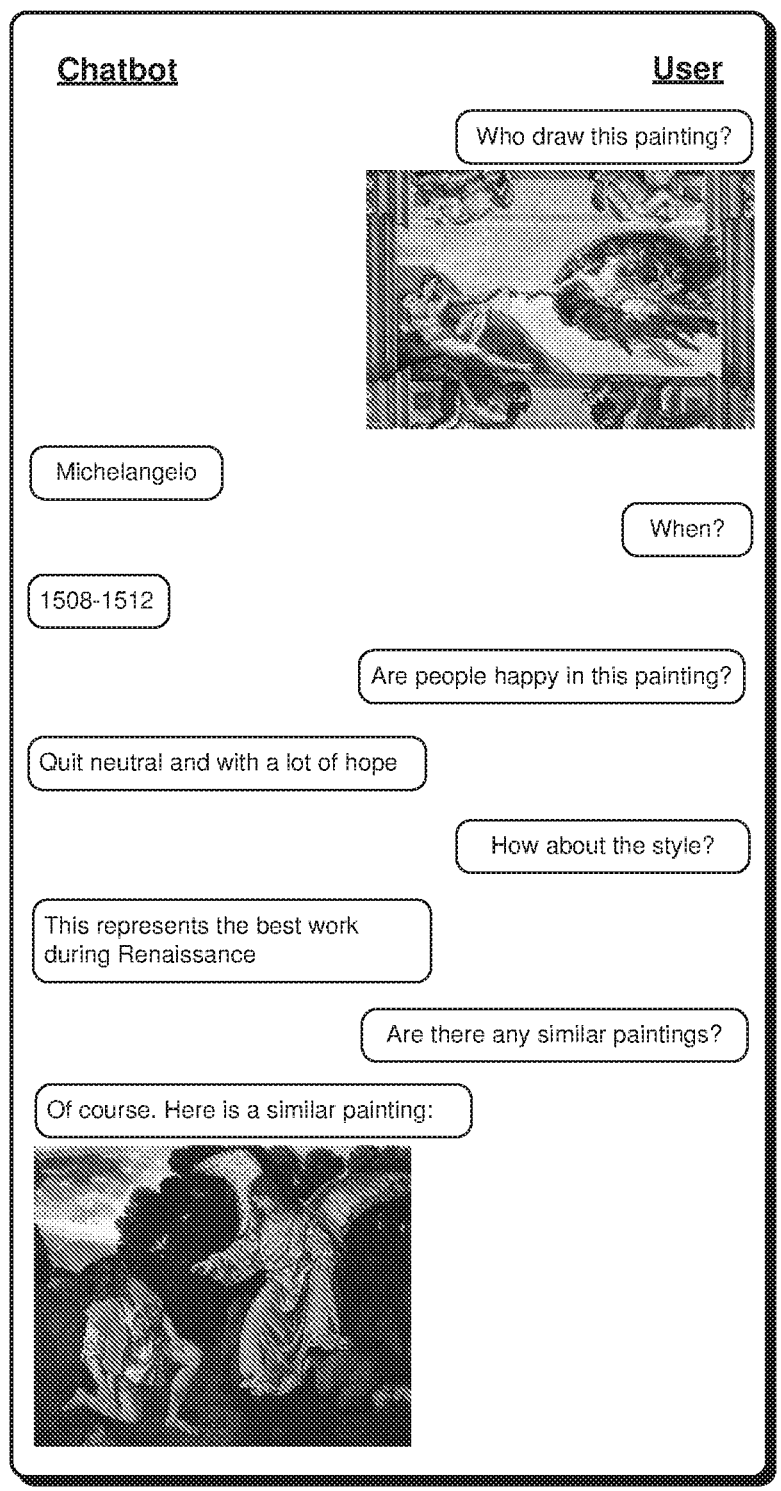
FIG. 19 illustrates an exemplary chat window according to an embodiment.

FIG. 19 illustrates an exemplary chat window 1900 according to an embodiment.

The user may send a message "Who draw this painting?" and upload an image representation of the painting. The chatbot may try to retrieve artist information about the painting from knowledge graphs. For example, the process 800 in FIG. 8 together with the similarity calculation 1512 in FIG. 15 and/or the similarity calculation 1716 in FIG. 17 may be performed so as to find a matched image in the knowledge graphs, and further retrieve artist information of the matched image from the knowledge graphs. The chatbot may return a response "Michelangelo" to the user to indicate the artist of this painting.

When the user asks "when?", it shows that the user wants to know time information of the painting. The chatbot may retrieve and return time information "1508-1512" from the knowledge graphs in a similar way as the retrieving of artist information.

The user may further ask "Are people happy in this painting?". The chatbot may determine an emotion category of the painting according to the above discussion. For example, a response "Quit neutral and with a lot of hope" may be provided to the user.

When receiving a message "How about the style?" from the user, the chatbot may determine a domain category of the painting according to the process 1500 in FIG. 15, and return a response "This represents the best work during Renaissance".

If the user asks "Are there any similar paintings?", the chatbot may perform the process 1700 in FIG. 17 so as to retrieve and return a painting in a similar style with the painting uploaded by the user.

Figure 20:
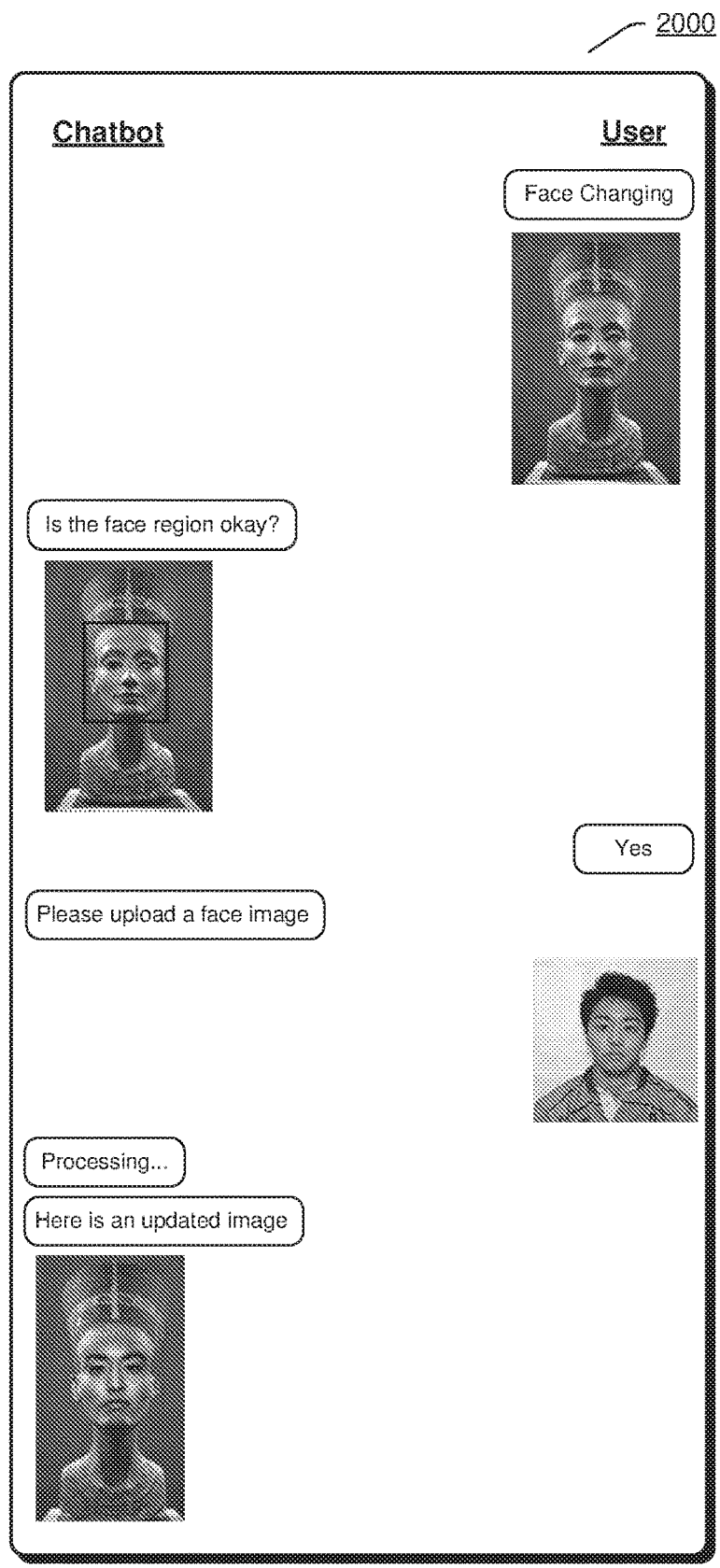
FIG. 20 illustrates an exemplary chat window according to an embodiment.

FIG. 20 illustrates an exemplary chat window 2000 according to an embodiment. In the chat window 2000, the chatbot may change an image representation of a piece of artwork.

The user requires "Face changing" and uploads an image representation of a piece of artwork. The chatbot may detect a face region in the image representation uploaded by the user and confirm with the user. Then the user may upload a designated image, e.g., the user's own photo, to the chatbot. The chatbot may perform the process 1800 in FIG. 18 so as to generate an updated image representation.

It should be appreciated that the chat windows in FIG. 19 and FIG. 20 are exemplary, and according to actual chatting scenarios, various chat flows may occur in the session between the chatbot and the user.

Figure 21A:
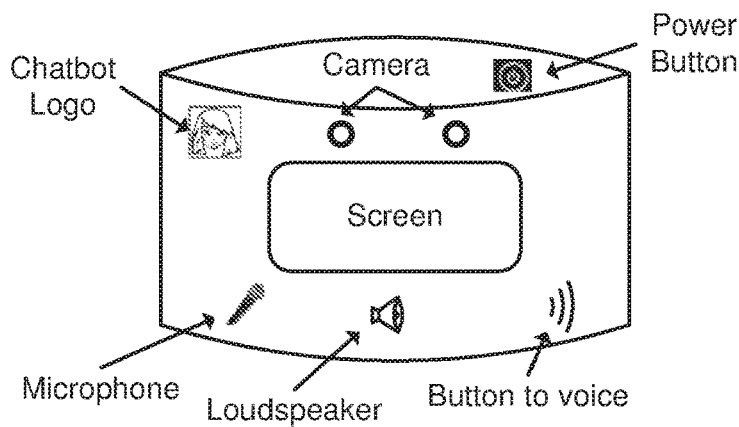
FIG. 21A-FIG. 21C illustrate exemplary hardware devices for providing an automatic chatting service according to an embodiment.
Figure 21B:
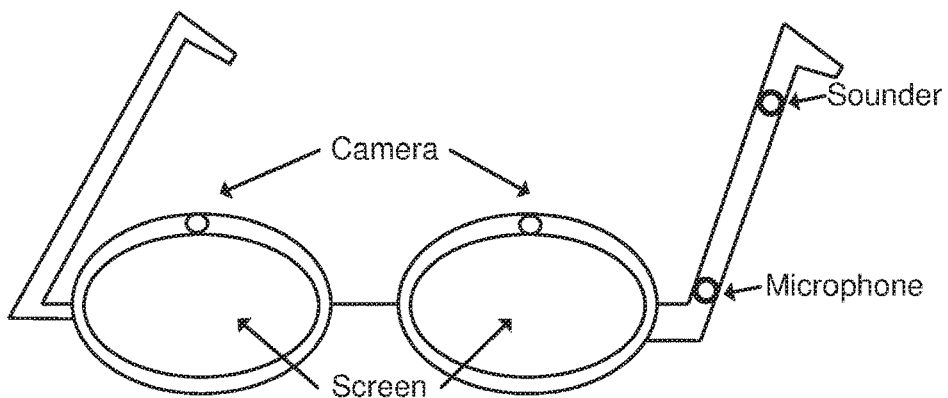
Figure 21C:
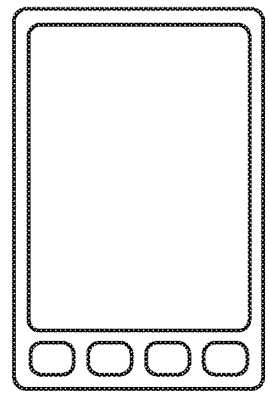

FIG. 21A-FIG. 21C illustrate exemplary hardware devices 2110, 2120 and 2130 for providing an automatic chatting service according to an embodiment. The chatbot according to the embodiments of the present disclosure may be implemented in the hardware devices 2110, 2120 and 2130.

The device 2110 is an intelligent terminal provided and used at a location of a partner. The device 2110 may comprise: at least one camera, for capturing a user's image or capturing images of articles in the user's view; a screen, which may present visual information to the user or may be touchable for interaction with the user; a microphone and a loudspeaker, for communicating with the user by voice; a button to voice, for switching to a voice-only mode; a power button; and a chatbot logo. According to actual requirements, the device 2110 may comprise more or less components. The device 2110 may be placed in a fixed location or may be carried by users. For example, the device 2110 may be placed at an entrance of art galleries, museums, etc., for guiding a user to visit, may be placed nearby a certain exhibited article so as to communicate with a user when the user is nearby the exhibited article, or may be carried by a user so as to provide an automated chatting service during the period the user carries it.

The device 2120 is a wearable device which comprises at least one screen, at least one camera, a sounder, a microphone, etc. Although the device 2120 is shown alike glasses, it can be any other types of wearable device, e.g., an intelligent watch.

The device 2130 is an intelligent terminal owned by a user. The device 2130 may be a smart phone, a tablet, a laptop, a desktop computer, etc. Through the device 2130, the user may communicate with the chatbot without restrictions of location.

It should be appreciated that the devices 2110, 2120 and 2130 are exemplary, and the chatbot according to the embodiments of the present disclosure may be implemented in any other types of hardware device.

Figure 22:
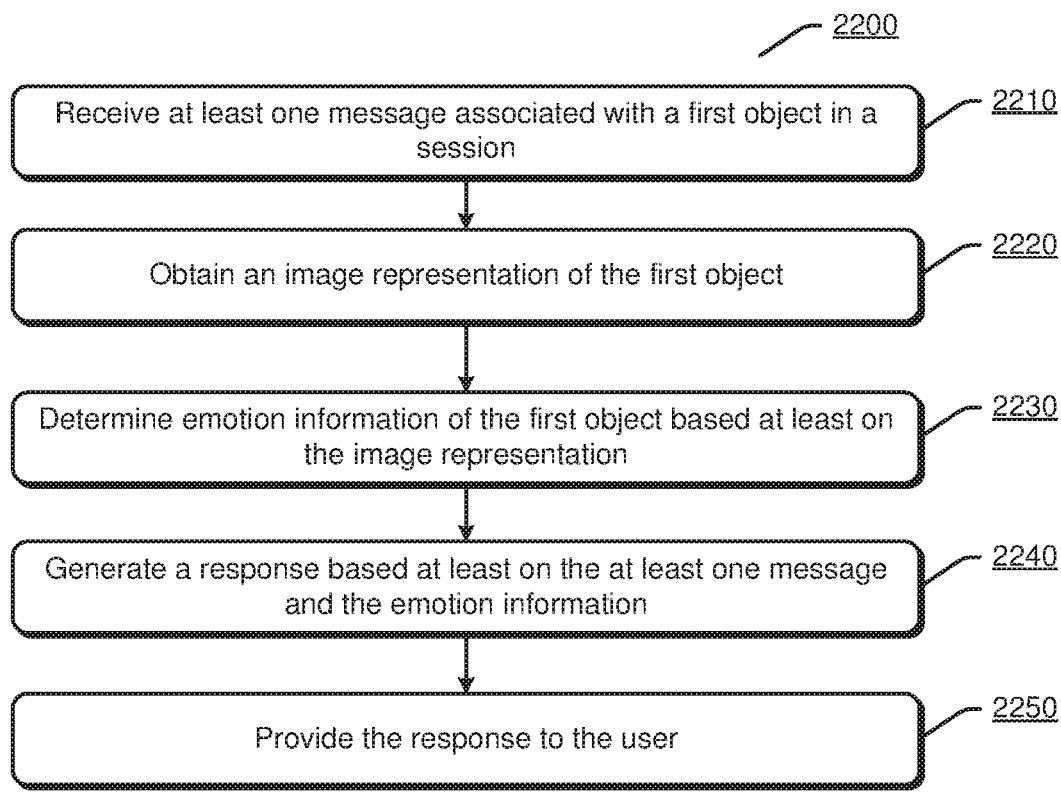
FIG. 22 illustrates a flowchart of an exemplary method for providing a response to a user in a session according to an embodiment.

FIG. 22 illustrates a flowchart of an exemplary method 2200 for providing a response to a user in a session according to an embodiment.

At 2210, at least one message associated with a first object may be received in the session, the session being between the user and an electronic conversational agent, e.g., a chatbot.

At 2220, an image representation of the first object may be obtained.

At 2230, emotion information of the first object may be determined based at least on the image representation.

At 2240, a response may be generated based at least on the at least one message and the emotion information.

At 2250, the response may be provided to the user.

In an implementation, the first object may be at least one of artworks, cultural relics, science and technology exhibits, and photography works.

In an implementation, the at least one message may indicate an intention of obtaining an emotion category of the first object, and the generating the response may comprise: determining the emotion category of the first object based at least on the emotion information of the first object.

In an implementation, the at least one message may indicate an intention of obtaining a domain category of the first object, and the generating the response may comprise: determining the domain category of the first object based at least on the emotion information of the first object, fact information of the first object, and knowledge information associated with the first object in a knowledge graph. The knowledge information associated with the first object may be obtained through: identifying, from the knowledge graph, a second object that matches with the first object in a dense vector space; and retrieving attributes of the second object from the knowledge graph as the knowledge information.

In an implementation, the at least one message may indicate an intention of obtaining an image representation of a second object corresponding to the first object, and the generating the response may comprise: determining similarities between the first object and candidate objects in a knowledge graph based at least on the emotion information; selecting the second object based at least on the similarities; and including the image representation of the second object in the response. The determining the similarities may comprise: calculating similarity scores between the image representation of the first object and image representations of the candidate objects in the knowledge graph based at least on the emotion information. Moreover, the determining the similarities may comprise: converting the image representation of the first object into a text representation; and calculating similarity scores between the text representation of the first object and text descriptions of the candidate objects in the knowledge graph. The converting may be based at least on the emotion information.

In an implementation, the at least one message may indicate an intention of changing a first face region in the image representation with a second face region in a designated image, and the generating the response may comprise: generating an updated image representation through replacing the first face region by the second face region based on a GAN. The at least one message may further indicate a designated emotion, and the generating the updated image representation may be further based on the designated emotion.

In an implementation, the at least one message may comprise at least one of text message, image message, voice message and video message.

It should be appreciated that the method 2200 may further comprise any steps/processes for providing a response to a user in a session according to the embodiments of the present disclosure as mentioned above.

Figure 23:
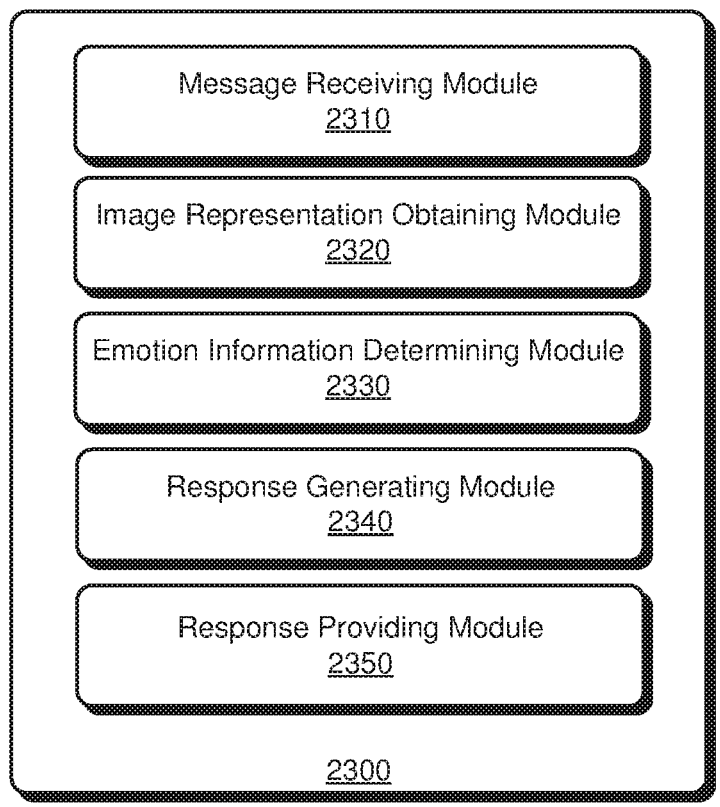
FIG. 23 illustrates an exemplary apparatus for providing a response to a user in a session according to an embodiment.

FIG. 23 illustrates an exemplary apparatus 2300 for providing a response to a user in a session according to an embodiment.

The apparatus 2300 may comprise: a message receiving module 2310, for receiving at least one message associated with a first object in the session, the session being between the user and an electronic conversational agent; an image representation obtaining module 2320, for obtaining an image representation of the first object; an emotion information determining module 2330, for determining emotion information of the first object based at least on the image representation; a response generating module 2340, for generating a response based at least on the at least one message and the emotion information; and a response providing module 2350, for providing the response to the user.

In an implementation, the first object may be at least one of artworks, cultural relics, science and technology exhibits, and photography works.

In an implementation, the at least one message may indicate an intention of obtaining an emotion category of the first object, and the response generating module may be further for: determining the emotion category of the first object based at least on the emotion information of the first object.

In an implementation, the at least one message may indicate an intention of obtaining a domain category of the first object, and the response generating module may be further for: determining the domain category of the first object based at least on the emotion information of the first object, fact information of the first object, and knowledge information associated with the first object in a knowledge graph.

In an implementation, the at least one message may indicate an intention of obtaining an image representation of a second object corresponding to the first object, and the response generating module may be further for: determining similarities between the first object and candidate objects in a knowledge graph based at least on the emotion information; selecting the second object based at least on the similarities; and including the image representation of the second object in the response.

In an implementation, the at least one message may indicate an intention of changing a first face region in the image representation with a second face region in a designated image, and the response generating module may be further for: generating an updated image representation through replacing the first face region by the second face region based on a GAN. The at least one message may further indicate a designated emotion, and the generating the updated image representation may be further based on the designated emotion.

Moreover, the apparatus 2300 may also comprise any other modules configured for providing a response to a user in a session according to the embodiments of the present disclosure as mentioned above.

Figure 24:
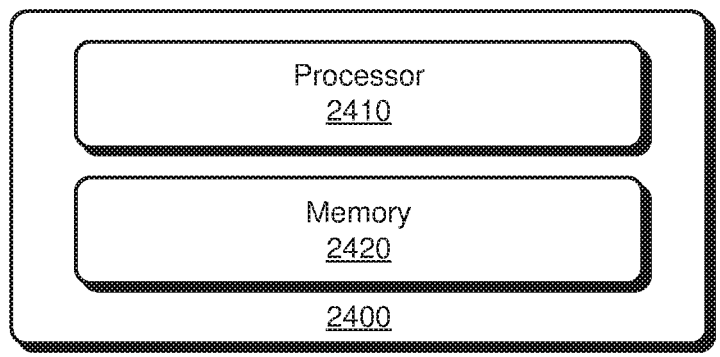
FIG. 24 illustrates an exemplary apparatus for providing a response to a user in a session according to an embodiment.

FIG. 24 illustrates an exemplary apparatus 2400 for providing a response to a user in a session according to an embodiment.

The apparatus 2400 may comprise one or more processors 2410 and a memory 2420 storing computer-executable instructions. When executing the computer-executable instructions, the one or more processors 2410 may: receive at least one message associated with a first object in the session, the session being between the user and an electronic conversational agent; obtain an image representation of the first object; determine emotion information of the first object based at least on the image representation; generate a response based at least on the at least one message and the emotion information; and provide the response to the user. The one or more processors 2410 may be further configured for performing any operations of the methods for providing a response to a user in a session according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for providing a response to a user in a session according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing a response to a user in a chat session between the user and a chatbot, the method performed by the chatbot, the method comprising:
during the chat session between the user and the chatbot, receiving over a network and from a computing device of the user at least one message associated with a first object, wherein the at least one message indicates an instruction for obtaining an image representation of a second object corresponding to the first object;
obtaining an image representation of the first object;
determining emotion information of the first object based at least on the image representation;
determining similarities between the first object and candidate objects in a knowledge graph based at least on the emotion information;
selecting the second object from the candidate objects based at least on the similarities;
generating a response to include the image representation of the second object; and
providing the response, by the chatbot, to the user.

2. The method of claim 1, wherein the first object comprises:
an artwork, a cultural relic, a science and technology exhibit, or a photograph.

3. The method of claim 1, wherein the at least one message indicates an instruction for obtaining an emotion category of the first object, and the generating the response comprises:
determining the emotion category of the first object based at least on the emotion information of the first object.

4. The method of claim 1, wherein the at least one message indicates an instruction for obtaining a domain category of the first object, and the generating the response comprises:
determining the domain category of the first object based at least on the emotion information of the first object, fact information of the first object, and knowledge information associated with the first object in a knowledge graph.

5. The method of claim 4, wherein the knowledge information associated with the first object is obtained through:
identifying, from the knowledge graph, a second object that matches with the first object in a dense vector space; and
retrieving attributes of the second object from the knowledge graph as the knowledge information.

6. The method of claim 1, wherein the determining the similarities comprises:
calculating similarity scores between the image representation of the first object and image representations of the candidate objects in the knowledge graph based at least on the emotion information.

7. The method of claim 1, wherein the determining the similarities comprises:
converting the image representation of the first object into a text representation; and
calculating similarity scores between the text representation of the first object and text descriptions of the candidate objects in the knowledge graph.

8. The method of claim 7, wherein the converting is based at least on the emotion information.

9. The method of claim 1, wherein the at least one message indicates an instruction for changing a first face region in the image representation with a second face region in a designated image, and the generating the response comprises:
generating an updated image representation through replacing the first face region by the second face region based on a generation-adversarial network (GAN).

10. The method of claim 9, wherein the at least one message further indicates a designated emotion, and the generating the updated image representation is further based on the designated emotion.

11. The method of claim 1, wherein the at least one message comprises at least one of text message, image message, voice message and video message.

12. An apparatus comprising:
one or more processors; and
a memory storage device storing thereon computer-executable instructions which, when executed by the one or more processors, cause the one or more processors to perform operations comprising:
during a chat session between a user and a chatbot, receiving over a network and from a computing device of the user at least one message associated with a first object, wherein the at least one message indicates an instruction for obtaining an image representation of a second object corresponding to the first object;
obtaining an image representation of the first object;
determining emotion information of the first object based at least on the image representation;
determining similarities between the first object and candidate objects in a knowledge graph based at least on the emotion information;
selecting the second object from the candidate objects based at least on the similarities;
generating a response to the message received from the computing device of the user, the response generated to include the image representation of the second object; and
communicating the response, by the chatbot, to the computing device of the user.

13. The apparatus of claim 12, wherein the first object comprises:
an artwork, a cultural relic, a science and technology exhibit, or a photograph.

14. The apparatus of claim 12, wherein the at least one message indicates an instruction for obtaining an emotion category of the first object, and the operations further comprising:
determining the emotion category of the first object based at least on the emotion information of the first object.

15. The apparatus of claim 12, wherein the at least one message indicates an instruction for obtaining a domain category of the first object, and the operations further comprising:
determining the domain category of the first object based at least on the emotion information of the first object, fact information of the first object, and knowledge information associated with the first object in a knowledge graph.

16. The apparatus of claim 12, wherein the at least one message indicates an instruction for obtaining an image representation of a second object corresponding to the first object, and the operations further comprising:
determining similarities between the first object and candidate objects in a knowledge graph based at least on the emotion information;
selecting the second object based at least on the similarities; and
including the image representation of the second object in the response.

17. The apparatus of claim 12, wherein the at least one message indicates an instruction for changing a first face region in the image representation with a second face region in a designated image, and the operations further comprising:
generating an updated image representation through replacing the first face region by the second face region based on a generation-adversarial network (GAN).

18. The apparatus of claim 17, wherein the at least one message further indicates a designated emotion, and the generating the updated image representation is further based on the designated emotion.

19. An apparatus for providing a response to a user in a chat session with a chatbot, the apparatus comprising:
means for receiving over a network and from a computing device of the user at least one message associated with a first object, wherein the at least one message indicates an instruction for obtaining an image representation of a second object corresponding to the first object;
means for obtaining an image representation of the first object;
means for determining emotion information of the first object based at least on the image representation;
means for determining similarities between the first object and candidate objects in a knowledge graph based at least on the emotion information;
means for generating a response to include the image representation of the second object; and
means for providing the response, by the chatbot, to the user.

* * * * *